(12) United States Patent
Shibai et al.

(10) Patent No.: US 10,947,411 B2
(45) Date of Patent: Mar. 16, 2021

(54) OPTICAL MEMBER AND POLYMER LAYER

(71) Applicant: SHARP KABUSHIKI KAISHA, Sakai (JP)

(72) Inventors: Yasuhiro Shibai, Sakai (JP); Ken Atsumo, Sakai (JP); Hidekazu Hayashi, Sakai (JP); Nobuaki Yamada, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 540 days.

(21) Appl. No.: 16/061,474

(22) PCT Filed: Dec. 8, 2016

(86) PCT No.: PCT/JP2016/086467
§ 371 (c)(1),
(2) Date: Jun. 12, 2018

(87) PCT Pub. No.: WO2017/104520
PCT Pub. Date: Jun. 22, 2017

(65) Prior Publication Data
US 2020/0263055 A1    Aug. 20, 2020

(30) Foreign Application Priority Data

Dec. 15, 2015  (JP) .............................. JP2015-244292

(51) Int. Cl.
*C09D 177/06*    (2006.01)
*C08J 5/18*    (2006.01)
(Continued)

(52) U.S. Cl.
CPC .............. *C09D 177/06* (2013.01); *B32B 3/30* (2013.01); *C08F 20/56* (2013.01); *C08F 220/00* (2013.01);
(Continued)

(58) Field of Classification Search
CPC .. C09D 133/14; C09D 133/24; C09D 133/26; C09D 177/00–12; C09D 5/006;
(Continued)

(56) References Cited

U.S. PATENT DOCUMENTS

2013/0129977 A1    5/2013    Takihara et al.
2014/0127463 A1    5/2014    Otani et al.

FOREIGN PATENT DOCUMENTS

JP    2009-031764 A    2/2009
JP    2012-247681 A    12/2012
(Continued)

*Primary Examiner* — Kregg T Brooks
(74) *Attorney, Agent, or Firm* — ScienBiziP, P.C.

(57) ABSTRACT

The optical member of the present invention includes a substrate and a polymer layer that is in direct contact with the substrate and includes on a surface thereof an uneven structure provided with multiple projections at a pitch not longer than a wavelength of visible light, the polymer layer containing an amide group, the polymer layer having an amide group concentration of 2 mmol/g or higher and lower than 5 mmol/g, the polymer layer having a minimum storage modulus E' of $1 \times 10^8$ Pa or higher and $1 \times 10^9$ Pa or lower at a bottom temperature of 110° C. or higher and 210° C. or lower in a dynamic viscoelasticity measurement with a measurement temperature range of −50° C. to 250° C., a temperature rise rate of 5° C./min, and a frequency of 10 Hz.

12 Claims, 3 Drawing Sheets

(51) Int. Cl.

| | | |
|---|---|---|
| *C09D 133/08* | (2006.01) | |
| *G02B 1/04* | (2006.01) | |
| *G02B 1/118* | (2015.01) | |
| *C09D 133/26* | (2006.01) | |
| *C08F 220/00* | (2006.01) | |
| *C09D 133/14* | (2006.01) | |
| *B32B 3/30* | (2006.01) | |
| *C08F 20/56* | (2006.01) | |

(52) U.S. Cl.
CPC ............... *C08J 5/18* (2013.01); *C09D 133/08* (2013.01); *C09D 133/14* (2013.01); *C09D 133/26* (2013.01); *G02B 1/04* (2013.01); *G02B 1/118* (2013.01)

(58) Field of Classification Search
CPC .......... C08L 33/14; C08L 33/24; C08L 33/26; C08J 2333/14; C08J 2333/24; C08J 2333/26; C08J 2433/14; C08J 2433/24; C08J 2433/26; B32B 3/30; B32B 27/308; C08F 220/52; C08F 220/56; C08F 20/52; C08F 20/56; G02B 1/04; G02B 1/118
See application file for complete search history.

(56) References Cited

FOREIGN PATENT DOCUMENTS

| | | |
|---|---|---|
| JP | 2013-018910 A | 1/2013 |
| JP | 2013-039711 A | 2/2013 |
| JP | 2013-252689 A | 12/2013 |
| WO | 2011/125699 A1 | 10/2011 |
| WO | 2013/005769 A1 | 1/2013 |
| WO | 2017/022701 A1 | 2/2017 |

(a)

(b)

(c)

(d)

OPTICAL MEMBER AND POLYMER LAYER

TECHNICAL FIELD

The present invention relates to optical members and polymer layers. More specifically, the present invention relates to an optical member including an uneven structure of nanometer scale and a polymer layer suitable as a constituent member of the optical member.

BACKGROUND ART

Various optical members having antireflective properties have been studied (for example, Patent Literatures 1 to 4). In particular, optical members including an uneven structure of nanometer scale (nanostructure) are known for their excellent antireflective properties. This uneven structure has a continuously varying refractive index from the air layer to the substrate, thereby capable of reducing the reflected light significantly.

CITATION LIST

Patent Literature

Patent Literature 1: WO 2013/005769
Patent Literature 2: JP 2013-18910 A
Patent Literature 3: JP 2013-252689 A
Patent Literature 4: JP 2013-39711 A

SUMMARY OF INVENTION

Technical Problem

Examples of such optical members include configurations in which a polymer layer including an uneven structure is disposed on a substrate. The present inventors have made studies on the configurations and have found that a polymer layer containing an amide group has high hydrogen-bonding strength and thus exhibits high adhesion to a substrate (in particular, a highly polar, non-surface-treated substrate). Also, since amide groups (amide bonds) have high cohesion therebetween, the surface of the polymer layer opposite to the substrate was found to be less likely to have scratch marks even when rubbed with a hard product such as steel wool.

The studies made by the present inventors, however, revealed that too high an amide group content causes the polymer layer to be hard and less elastic. Such a polymer layer has a problem that when its surface opposite to the substrate is rubbed with a soft material such as nonwoven fabric, projections (protrusions) fallen by the rubbing fail to rise (restore) again, so that the optical member appears white. In other words, the polymer layer unfortunately has poor rubbing resistance.

Conventional optical members, as described above, have a problem in achieving both the adhesion between the substrate and the polymer layer and the rubbing resistance. Yet, any solution to the problem has not been found.

For example, Patent Literature 1 discloses that a substrate containing triacetyl cellulose and a cured product of an active-energy-ray-curable resin composition having a micro uneven structure are tightly bonded to each other. Patent Literature 1, however, includes no statements relating to a decrease in rubbing resistance, failing to solve the above problem. The inventions disclosed in Patent Literatures 2 to 4 also failed to solve the above problem.

The present invention has been made in view of such a current state of the art and aims to provide an optical member achieving both the adhesion between the substrate and the polymer layer and the rubbing resistance, and a polymer layer achieving both the adhesion to the substrate and the rubbing resistance.

Solution to Problem

The present inventors have made various studies on an optical member achieving both the adhesion between the substrate and the polymer layer and the rubbing resistance, and have focused on a configuration in which the polymer layer contains an amide group and keeps its elasticity. They have then found that when the polymer layer contains an amide group at a given concentration and has the minimum storage modulus and the bottom temperature at the minimum storage modulus falling within the respective given ranges, the optical member can achieve both the adhesion between the substrate and the polymer layer and the rubbing resistance. Thereby, the inventors have arrived at the solution to the above problem, completing the present invention.

In other words, one aspect of the present invention may be an optical member including a substrate and a polymer layer that is in direct contact with the substrate and includes on a surface thereof an uneven structure provided with multiple projections at a pitch not longer than a wavelength of visible light, the polymer layer containing an amide group, the polymer layer having an amide group concentration of 2 mmol/g or higher and lower than 5 mmol/g, the polymer layer having a minimum storage modulus E' of $1\times10^8$ Pa or higher and $1\times10^9$ Pa or lower at a bottom temperature of 110° C. or higher and 210° C. or lower in a dynamic viscoelasticity measurement with a measurement temperature range of −50° C. to 250° C., a temperature rise rate of 5° C./rain, and a frequency of 10 Hz.

Another aspect of the present invention may be a polymer layer including, on a surface thereof, an uneven structure provided with multiple projections at a pitch not longer than a wavelength of visible light, the polymer layer containing an amide group at a concentration of 2 mmol/g or higher and lower than 5 mmol/g, the polymer layer having a minimum storage modulus E' of $1\times10^8$ Pa or higher and $1\times10^9$ Pa or lower at a bottom temperature of 110° C. or higher and 210° C. or lower in a dynamic viscoelasticity measurement with a measurement temperature range of −50° C. to 250° C., a temperature rise rate of 5° C./min, and a frequency of 10 Hz.

Advantageous Effects of Invention

The present invention can provide an optical member achieving both the adhesion between a substrate and a polymer layer and the rubbing resistance. The present invention can also provide a polymer layer achieving both the adhesion to the substrate and the rubbing resistance.

BRIEF DESCRIPTION OF DRAWINGS

FIG. 3(a) shows the case where the bottom temperature and the minimum storage modulus E' fall within the respective appropriate ranges, FIG. 3(b) shows the case where the minimum storage modulus E' is less than that in the case of FIG. 3(a), and FIG. 3(c) shows the case where at least one of the bottom temperature and the minimum storage modulus E' is higher than the corresponding value in the case of FIG. 3(a).

DESCRIPTION OF EMBODIMENTS

Hereinafter, the present invention is described in more detail based on an embodiment with reference to the drawings. The embodiment, however, is not intended to limit the scope of the present invention. The configurations of the embodiment may appropriately be combined or modified within the spirit of the present invention.

Embodiment

Figure 1:
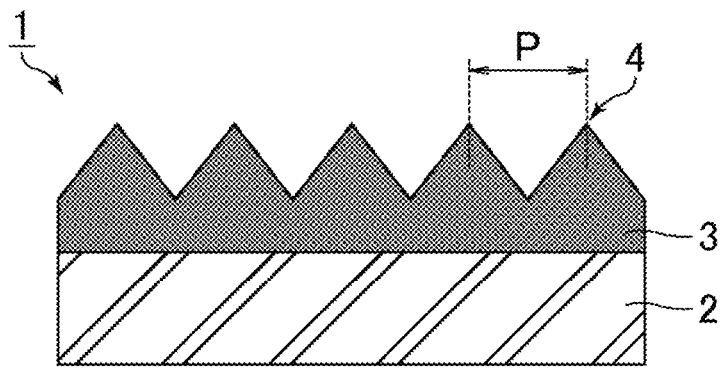
FIG. 1 is a schematic cross-sectional view of an optical member of an embodiment.

FIG. 1 is a schematic cross-sectional view of an optical member of an embodiment. As shown in FIG. 1, an optical member 1 includes a substrate 2 and a polymer layer 3 that is in direct contact with the substrate 2. The polymer layer 3 includes on a surface thereof an uneven structure provided with multiple projections (protrusions) 4 at a pitch (distance between the apexes of adjacent projections 4) P not longer than a wavelength of visible light. The optical member 1 therefore corresponds to an antireflective member having a moth-eye structure (a structure like a moth's eye). Thus, the optical member 1 can exert excellent antireflective properties (low reflectivity) owing to the moth-eye structure.

The substrate 2 may be formed of any material such as triacetyl cellulose (TAC), polyethylene terephthalate (PET), or methyl methacrylate (MMA). The polymer layer 3 in the present embodiment contains an amide group as described below, so that the adhesion between the substrate 2 and the polymer layer 3 is high even in the case where the substrate 2 contains triacetyl cellulose which has high polarity. More specifically, the adhesion between the substrate 2 and the polymer layer 3 is high even in the case where the substrate 2 contains triacetyl cellulose at least on the surface thereof adjacent to the polymer layer 3. Triacetyl cellulose as used herein refers to cellulose acetate having a degree of acetylation of 58% or higher, preferably cellulose acetate having a degree of acetylation of 61% or higher. The substrate 2 may contain appropriate amount(s) of additive(s) such as a plasticizer as well as the above materials.

The surface of the substrate 2 adjacent to the polymer layer 3 may not have been subjected to surface treatment or may have been subjected to surface treatment such as cleaning treatment. Meanwhile, since the substrate 2 and the polymer layer 3 are in direct contact with each other, there is no layer formed by surface treatment (e.g., primer layer formed by primer treatment) on the surface of the substrate 2 adjacent to the polymer layer 3.

The substrate 2 may have any shape such as a film shape or a sheet shape. In the case of forming the optical member 1 into a film shape, a film-shaped substrate 2 may be used. For example, a film such as a triacetyl cellulose film (TAC film) is preferred. Also, the substrate 2 preferably constitutes a polarizing plate.

The substrate 2 may have any thickness. In order to ensure the transparency and processability, the thickness is preferably 50 μm or greater and 100 μm or smaller.

The polymer layer 3 contains an amide group. The polymer layer 3 has amide group concentration of 2 mmol/g or higher and lower than 5 mmol/g. The polymer layer 3 having an amide group concentration lower than 2 mmol/g contains too small an amount of the amide group, exhibiting poor adhesion to the substrate 2. The polymer layer 3 having an amide group concentration of 5 mmol/g or higher has a low crosslinking density and a very strong cohesive force between bonds, exhibiting high hardness and low rubbing resistance. In order to sufficiently increase the adhesion between the substrate 2 and the polymer layer 3 and the rubbing resistance, the polymer layer 3 preferably has an amide group concentration of 2.5 mmol/g or higher and lower than 4.5 mmol/g, more preferably 3 mmol/g or higher and lower than 4 mmol/g.

The polymer layer 3 has a bottom temperature of 110° C. or higher and 210° C. or lower and a minimum storage modulus E' of $1 \times 10^8$ Pa or higher and $1 \times 10^9$ Pa or lower in a dynamic viscoelasticity measurement with a measurement temperature range of −50° C. to 250° C., a temperature rise rate of 5° C./min, and a frequency of 10 Hz, the polymer layer 3 exhibiting the minimum storage modulus E' at the bottom temperature (hereinafter, such storage modulus E' in the dynamic viscoelasticity measurement is simply referred to as storage modulus E'). The polymer layer 3 having the bottom temperature and the minimum storage modulus E' out of the above respective ranges has poor rubbing resistance and, when its surface opposite to the substrate 2 is rubbed with a soft material such as nonwoven fabric, the projections 4 fallen by the rubbing fail to rise (restore) again, so that the optical member 1 appears white. In order to sufficiently increase the rubbing resistance of the polymer layer 3, the polymer layer 3 preferably has a bottom temperature of 125° C. or higher and 195° C. or lower and a minimum storage modulus E' of $1.5 \times 10^8$ Pa or higher and $9 \times 10^8$ Pa or lower, more preferably a bottom temperature of 140° C. or higher and 180° C. or lower and a minimum storage modulus E' of $2 \times 10^8$ Pa or higher and $8 \times 10^8$ Pa or lower. The bottom temperature and the minimum storage modulus E' as used herein are determined based on the storage modulus E' that is measured with a viscoelasticity measuring apparatus (trade name: DMA7100) from Hitachi High-Tech Science Corporation as a measuring machine with a measurement temperature range of −50° C. to 250° C., a temperature rise rate of 5° C./min, and a frequency of 10 Hz. The bottom temperature and the minimum storage modulus E' can be adjusted by varying the composition of the polymer layer 3 (in particular, the compositions of the constituent components such as a monofunctional amide monomer in the later-described polymerizable composition).

The relationship between the storage modulus E' and the rubbing resistance is described below.

Figure 2:
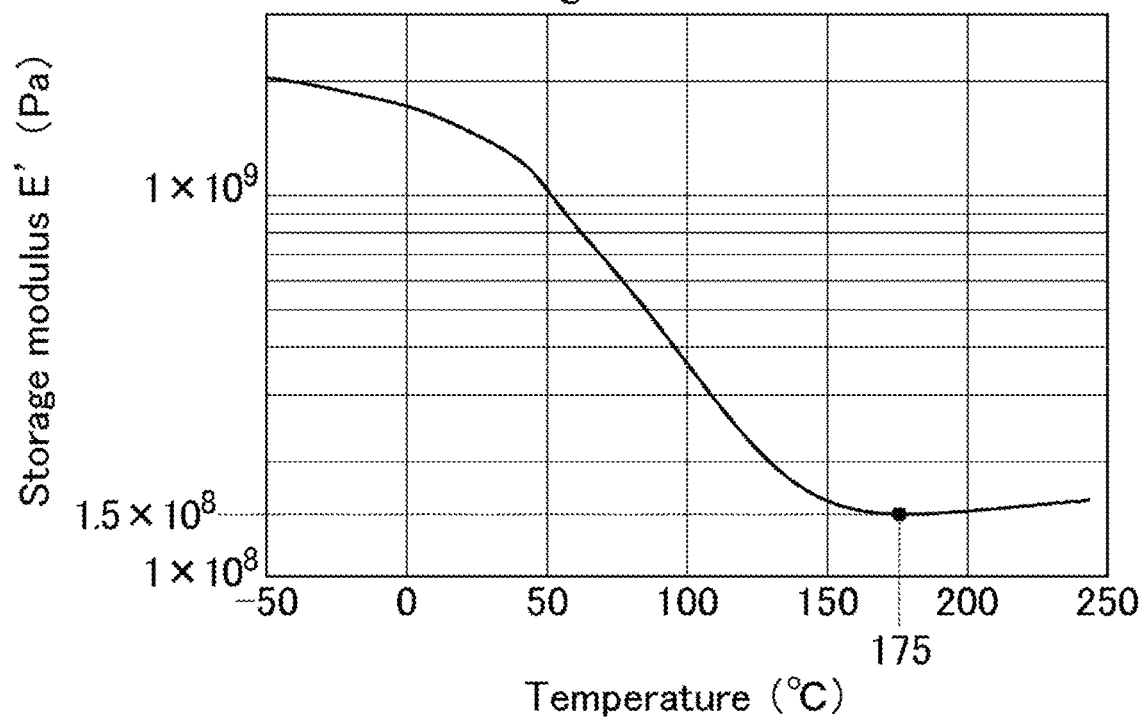
FIG. 2 is a graph showing a measurement example of storage modulus E' of a polymer layer.

FIG. 2 is a graph showing a measurement example of storage modulus E' of a polymer layer. As shown in FIG. 2, the storage modulus E' decreases as the temperature rises, and then stays constant or increases. The storage modulus E' starts increasing because the polymer layer 3 expands as the temperature rises. In FIG. 2, the bottom temperature at which the storage modulus E' is at the minimum is 175° C. and the minimum storage modulus E' is $1.5 \times 10^8$ Pa.

Figure 3:
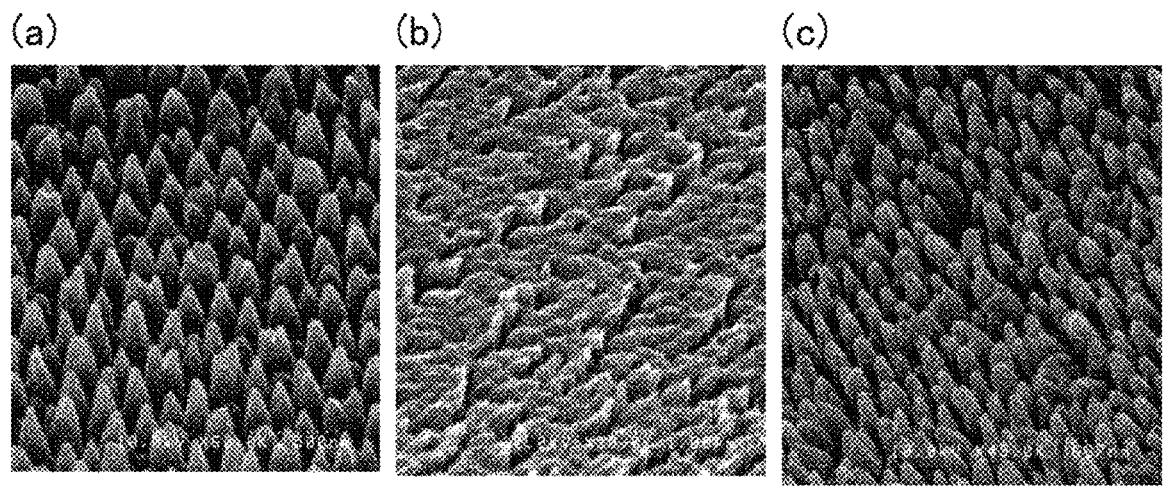
FIG. 3 shows SEM photographs of a polymer layer after rubbing.

FIG. 3 shows SEM photographs of a polymer layer after rubbing; FIG. 3(a) shows the case where the bottom temperature and the minimum storage modulus E' fall within the respective appropriate ranges, FIG. 3(b) shows the case where the minimum storage modulus E' is less than that in the case of FIG. 3(a), and FIG. 3(c) shows the case where at least one of the bottom temperature and the minimum storage modulus E' is higher than the corresponding value in the case of FIG. 3(a). Usually, a region with a high storage modulus E' is a crystalline region, a region with a lower storage modulus E' than the crystalline region is an elastic region, and a region with an even lower storage modulus E' is a fluid region. When the surface of the polymer layer 3 opposite to the substrate 2 is rubbed with a soft material such as nonwoven fabric, the projections 4 fall once. Here, with a storage modulus E' in the fluid region, the polymer layer 3 (projections 4) is soft and has insufficient elasticity, so that the projections 4 do not rise (restore) again as shown in FIG. 3(b). Also, with a storage modulus E' in the crystalline region, the polymer layer 3 (projections 4) is hard and thus the projections 4 are less likely to fall but, as shown in FIG. 3(c), also less likely to rise (restore) again. In contrast, with the bottom temperature and the minimum storage modulus E' falling within the respective appropriate ranges as in the present embodiment, the polymer layer 3 (projections 4) has an appropriate elasticity, so that the projections 4 rise (restore) again as shown in FIG. 3(a). In other words, such a polymer layer 3 can exhibit excellent rubbing resistance. Here, with a minimum storage modulus E' falling within an appropriate range and a bottom temperature being higher than that in the state shown in FIG. 3(a), the environmental temperature during rubbing the surface of the polymer layer 3 opposite to the substrate 2 is significantly different from the bottom temperature to cause the polymer layer 3 (projections 4) to be very hard and insufficient in elasticity, so that the projections 4 do not rise (restore) again as shown in FIG. 3(c).

The rubbing resistance is generally assumed to correlate with the crosslinking density and glass transition temperature (Tg) of the polymer layer 3. However, studies made by the present inventors have found that the rubbing resistance correlates better with the bottom temperature and the minimum storage modulus E', seemingly for the following reason. The crosslinking density n is a value calculated from the formula: $n=E'/3RT$ (E': storage modulus, R: gas constant, T: absolute temperature). The glass transition temperature Tg is a value (temperature) corresponding to the peak in a graph showing the temperature dependence of $\tan \delta = E''/E'$ (E': storage modulus, E'': loss modulus). In other words, the crosslinking density and the glass transition temperature are values obtained indirectly using values such as storage modulus E'. In contrast, the bottom temperature and the minimum storage modulus E' are values obtained directly from a graph showing the temperature dependence of the storage modulus E' as shown in FIG. 2. For this reason, restoration (rubbing resistance) of fine protrusions such as the projections 4 is considered to correlate better with the bottom temperature and the minimum storage modulus E'.

The polymer layer 3 as described above can achieve both the adhesion to the substrate 2 and the rubbing resistance. Consequently, the polymer layer 3 can give the optical member 1 that achieves both the adhesion between the substrate 2 and the polymer layer 3 and the rubbing resistance.

The polymer layer 3 is preferably a cured product of a polymerizable composition (polymerizable composition 5 in FIG. 4 described below), particularly a cured product of a (meth)acrylic polymerizable composition. The polymerizable composition is preferably polymerized (cured) by application of active energy rays. The active energy rays as used herein mean ultraviolet rays, visible light, infrared rays, or plasma, for example. The polymerizable composition is preferably polymerized (cured) by ultraviolet rays.

The polymerizable composition may appropriately contain a compound such as a monofunctional amide monomer, a polyfunctional acrylate, a monofunctional acrylate, or a fluorine-containing compound. The amide group in the polymer layer 3 is preferably one derived from a monofunctional amide monomer.

Examples of the monofunctional amide monomer include N-acryloylmorpholine, N,N-dimethylacrylamide, N,N-diethylacrylamide, N-vinyl-2-pyrrolidone, N,N-dimethylmethacrylamide, and N-methoxy-N-methyl-3-phenyl-acrylamide. Known examples of N-acryloylmorpholine include a monofunctional amide monomer (trade name: ACMO®) from KJ Chemicals Corp. Known examples of N,N-dimethylacrylamide include a monofunctional amide monomer (trade name: DMAA®) from KJ Chemicals Corp. Known examples of N,N-diethylacrylamide include a monofunctional amide monomer (trade name: DEAA®) from KJ Chemicals Corp. Known examples of N-vinyl-2-pyrrolidone include a monofunctional amide monomer (trade name: N-vinylpyrrolidone) from Nippon Shokubai Co., Ltd. Known examples of N,N-dimethylmethacrylamide include a monofunctional amide monomer (product code: D0745) from Tokyo Chemical Industry Co., Ltd. Known examples of N-methoxy-N-methyl-3-phenyl-acrylamide include a monofunctional amide monomer from Sigma-Aldrich Japan. The polymerizable composition may contain one or multiple of the monofunctional amide monomers.

The monofunctional amide monomer preferably contains at least one of N,N-dimethylacrylamide and N,N-diethylacrylamide. N,N-dimethylacrylamide and N,N-diethylacrylamide have a high molecular weight and a low glass transition temperature among monofunctional amide monomers, and therefore can, even in a small amount, favorably increase the adhesion between the substrate 2 and the polymer layer 3 and the rubbing resistance.

Examples of the polyfunctional acrylate include urethane acrylate, ethoxylated pentaerythritol tetraacrylate, pentaerythritol triacrylate, 1,9-nonanediol diacrylate, dipentaerythritol hexaacrylate, a mixture of tripentaerythritol acrylate, mono- and di-pentaerythritol acrylates, and a polypentaerythritol acrylate, ethoxylated polyglycerin polyacrylate, trimethylolpropane triacrylate, alkoxylated dipentaerythritol polyacrylate, polyethylene glycol (200) diacrylate, polyethylene glycol (300) diacrylate, polyethylene glycol (400) diacrylate, polyethylene glycol (600) diacrylate, hexafunctional polyester acrylate, ethoxylated glycerin triacrylate, 1,6-hexanediol diacrylate, tripropylene glycol diacrylate, and ethoxylated (4-mol adduct of) bisphenol A diacrylate. Known examples of urethane acrylate include a polyfunctional acrylate (trade name: UA-306H) from Kyoeisha Chemical Co., Ltd. and a polyfunctional acrylate (trade name: U-10PA) from Shin Nakamura Chemical Co., Ltd. Known examples of ethoxylated pentaerythritol tetraacrylate include a polyfunctional acrylate (trade name: ATM-35E) from Shin Nakamura Chemical Co., Ltd. Known examples of pentaerythritol triacrylate include a polyfunctional acrylate (trade name: A-TMM-3LM-N) from Shin Nakamura Chemical Co., Ltd., a polyfunctional acrylate (trade name: A-TMM-3L) from Shin Nakamura Chemical Co., Ltd., and a polyfunctional acrylate (trade name: PET-3) from DKS Co. Ltd. Known examples of 1,9-nonanediol diacrylate include a polyfunctional acrylate (trade name: A-NOD-N) from Shin Nakamura Chemical Co., Ltd. Known examples of dipentaerythritol hexaacrylate include a polyfunctional acrylate (trade name: Light Acrylate DPE-6A) from Kyoeisha Chemical Co., Ltd. Examples of the mixture of tripentaerythritol acrylate, mono- and di-pentaerythritol acrylates, and polypentaerythritol acrylate include a polyfunctional acrylate (trade name: Viscoat #802) from Osaka Organic Chemical Industry Ltd. Examples of ethoxylated polyglycerin polyacrylate include a polyfunctional acrylate (trade name: NK ECONOMER® A-PG5027E) from Shin Nakamura Chemical Co., Ltd. Known examples of trimethylolpropane triacrylate include a polyfunctional acrylate (trade name: Light Acrylate TMP-A) from Kyoeisha Chemical Co., Ltd. Known examples of alkoxylated dipentaerythritol polyacrylate include a polyfunctional acrylate (trade name: KAYARAD® DPEA-12) from Nippon Kayaku Co., Ltd. and a polyfunctional acrylate (trade name: KAYARAD DPCA-30) from Nippon Kayaku Co., Ltd. Known examples of polyethylene glycol (200) diacrylate include a polyfunctional acrylate (trade name: PE-200) from DKS Co. Ltd. Known examples of polyethylene glycol (300) diacrylate include a polyfunctional acrylate (trade name: PE-300) from DKS Co. Ltd. Known examples of polyethylene glycol (400) diacrylate include a polyfunctional acrylate (trade name: A-400) from Shin Nakamura Chemical Co., Ltd. Known examples of polyethylene glycol (600) diacrylate include a polyfunctional acrylate (trade name: A-600) from Shin Nakamura Chemical Co., Ltd. Known examples of hexafunctional polyester acrylate include a polyfunctional acrylate (trade name: EBECRYL® 450) from Daicel-Allnex Ltd. Known examples of ethoxylated glycerin triacrylate include a polyfunctional acrylate (trade name: A-GLY-9E) from Shin Nakamura Chemical Co., Ltd. Known examples of 1,6-hexanediol diacrylate include a polyfunctional acrylate (trade name: A-HD-N) from Shin Nakamura Chemical Co., Ltd. Known examples of tripropylene glycol diacrylate include a polyfunctional acrylate (trade name: APG-200) from Shin Nakamura Chemical Co., Ltd. Known examples of ethoxylated (4-mol adduct of) bisphenol A diacrylate include a polyfunctional acrylate (trade name: A-BPE-4) from Shin Nakamura Chemical Co., Ltd. The polymerizable composition may contain one or multiple of the polyfunctional acrylates.

Examples of the monofunctional acrylate include polypropylene glycol monoacrylate, 2-hydroxyethyl methacrylate, and 4-hydroxybutyl acrylate. Known examples of polypropylene glycol monoacrylate include a monofunctional acrylate (trade name: AP-550) from NOF Corporation. Known examples of 2-hydroxyethyl methacrylate include a monofunctional acrylate (trade name: 2HEMA) from Nippon Shokubai Co., Ltd. Known examples of 4-hydroxybutyl acrylate include a monofunctional acrylate (trade name: 4HBA) from Nippon Kasei Chemical Co., Ltd. The polymerizable composition may contain one or multiple of the monofunctional acrylates.

The fluorine-containing compound contains a fluorine-containing monomer as a constituent component. The fluorine-containing compound may further contain other monomer component(s) such as an acrylate monomer.

The fluorine-containing compound preferably contains a reactive group. The reactive group as used herein means a moiety reactive with another component under external energy such as light or heat. Examples of such a reactive group include an alkoxysilyl group, silyl ether group, silanol group obtained by hydrolysis of an alkoxysilyl group, carboxyl group, hydroxy group, epoxy group, vinyl group, allyl group, acryloyl group, and methacryloyl group. In terms of the reactivity and handleability, the reactive group is preferably an alkoxysilyl, silyl ether, silanol, epoxy, vinyl, allyl, acryloyl, or methacryloyl group, more preferably a vinyl, allyl, acryloyl, or methacryloyl group, still more preferably an acryloyl or methacryloyl group.

The fluorine atoms in the fluorine-containing compound are distributed on the surface of the polymer layer 3 opposite to the substrate 2. This increases the smoothness of the surface of the polymer layer 3 opposite to the substrate 2, so that a load on the projections 4 upon rubbing of the surface can be reduced. In addition, the hygroscopicity of the polymer layer 3 decreases, so that the adhesion between the substrate 2 and the polymer layer 3 can be prevented from decreasing due to hygroscopy. Also, even in the case where the amount of the monofunctional amide monomer is large and thus the polarity is very high, the adhesion between the substrate 2 and the polymer layer 3 can be prevented from decreasing due to hygroscopy.

The fluorine-containing compound can reduce the surface energy of the polymer layer 3 and give excellent water repellency to the optical member 1 when combined with a moth-eye structure. The resulting optical member 1 therefore has excellent antifouling properties against hydrophilic dirt. For the degree of water repellency, a contact angle with water is used as an index. A greater contact angle with water indicates a higher degree of water repellency. In order to obtain the optical member 1 having a sufficiently high degree of water repellency, the contact angle of the surface of the polymer layer 3 opposite to the substrate 2 with water is preferably 60° or greater.

The fluorine-containing monomer preferably contains, in addition to a reactive group, a moiety containing at least one selected from the group consisting of fluoroalkyl groups, fluorooxyalkyl groups, fluoroalkenyl groups, fluoroalkanediyl groups, and fluorooxyalkanediyl groups. Fluoroalkyl groups, fluorooxyalkyl groups, fluoroalkenyl groups, fluoroalkanediyl groups, and fluorooxyalkanediyl groups are substituents in which at least one of the hydrogen atoms is replaced by a fluorine atom respectively in alkyl groups, oxyalkyl groups, alkenyl groups, alkanediyl groups, and oxyalkanediyl groups. Fluoroalkyl groups, fluorooxyalkyl groups, fluoroalkenyl groups, fluoroalkanediyl groups, and fluorooxyalkanediyl groups are substituents mainly containing fluorine atoms and carbon atoms. The structure of each group may have a branch, and multiple of these substituents may be linked with each other.

An example of the fluorine-containing monomer, which is a constituent component of the fluorine-containing compound, is one represented by the following formula (A):

$$R^{f1}-R^2-D^1 \qquad (A)$$

wherein $R^{f1}$ is a moiety containing at least one selected from the group consisting of fluoroalkyl groups, fluorooxyalkyl groups, fluoroalkenyl groups, fluoroalkanediyl groups, and fluorooxyalkanediyl groups; $R^2$ is an alkanediyl group, an alkanetriyl group, or an ester, urethane, ether, or triazine structure derived therefrom; and $D^1$ is a reactive group.

Examples of the fluorine-containing monomer represented by the formula (A) include 2,2,2-trifluoroethyl acrylate, 2,2,3,3,3-pentafluoropropyl acrylate, 2-perfluorobutylethyl acrylate, 3-perfluorobutyl-2-hydroxypropyl acrylate, 2-perfluorohexylethyl acrylate, 3-perfluorohexyl-2-hydroxypropyl acrylate, 2-perfluorooctylethyl acrylate, 3-perfluorooctyl-2-hydroxypropyl acrylate, 2-perfluorodecylethyl acrylate, 2-perfluoro-3-methylbutylethyl acrylate, 3-perfluoro-3-methoxybutyl-2-hydroxypropyl acrylate, 2-perfluoro-5-methylhexylethyl acrylate, 3-perfluoro-5-methylhexyl-2-hydroxypropyl acrylate, 2-perfluoro-7-methyloctyl-2-hydroxypropyl acrylate, tetrafluoropropyl acrylate, octafluoropentyl acrylate, dodecafluoroheptyl acrylate, hexadecafluorononyl acrylate, hexafluorobutyl acrylate, 2,2,2-trifluoroethyl methacrylate, 2,2,3,3,3-pentafluoropropyl methacrylate, 2-perfluorobutylethyl methacrylate, 3-perfluorobutyl-2-hydroxypropyl methacrylate, 2-perfluorooctylethyl methacrylate, 3-perfluorooctyl-2-hydroxypropyl methacrylate, 2-perfluorodecylethyl methacrylate, 2-perfluoro-3-methylbutylethyl methacrylate, 3-perfluoro-3-methylbutyl-2-hydroxypropyl methacrylate, 2-perfluoro-5-methylhexylethyl methacrylate, 3-perfluoro-5-methylhexyl-2-hydroxypropyl methacrylate, 2-perfluoro-7-methyloctylethyl methacrylate, 3-perfluoro-7-methyloctylethyl methacrylate, tetrafluoropropyl methacrylate, octafluoropentyl methacrylate, dodecafluoroheptyl methacrylate, hexadecafluorononyl methacrylate, 1-trifluoromethyltrifluoroethyl methacrylate, hexafluorobutyl methacrylate, and triacryloyl-heptadecafluorononenyl-pentaerythritol.

An example of a material of the fluorine-containing monomer is preferably a material having a fluoropolyether moiety. The fluoropolyether moiety is a moiety formed of a fluoroalkyl group, an oxyfluoroalkyl group, an oxyfluoroalkyldiyl group, or the like, and is a structure typified by the following formula (B) or (C):

$$CF_{n1}H_{(3-n1)}{-}(CF_{n2}H_{(2-n2)})_kO{-}(CF_{n3}H_{(2-n3)})_mO{-} \quad (B)$$

$$-(CF_{n4}H_{(2-n4)})_pO{-}(CF_{n5}H_{(2-n5)})_sO{-} \quad (C)$$

wherein n1 is an integer of 1 to 3; n2 to n5 are each 1 or 2; and k, m, p, and s are each an integer of 0 or greater. A preferred combination of n1 to n5 is such that n1 is 2 or 3 and n2 to n5 are each 1 or 2. A more preferred combination is such that n1 is 3, n2 and n4 are 2, and n3 and n5 are 1 or 2.

The fluoropolyether moiety preferably has a carbon number of 4 or more and 12 or less, more preferably 4 or more and 10 or less, still more preferably 6 or more and 8 or less. If the carbon number is less than 4, the surface energy may unfortunately be low. If the carbon number is more than 12, the solubility in a solvent may unfortunately be low. The fluorine-containing monomer may contain multiple fluoropolyether moieties per molecule.

Known examples of the fluorine-containing compound include a fluorine-based additive (trade name: Optool® DAC-HP) from Daikin Industries, Ltd., a fluorine-based additive (trade name: Afluid) from Asahi Glass Co., Ltd., a fluorine-based additive (trade name: Megaface® RS-76-NS) from DIC Corp., a fluorine-based additive (trade name: Megaface RS-90) from DIC Corp., a fluorine-based additive (trade name: Ftergent® 601AD) from Neos Co., Ltd., a fluorine-based additive (trade name: C10GACRY) from Yushiseihin Co., Ltd., and a fluorine-based additive (trade name: C8HGOL) from Yushiseihin Co., Ltd. The fluorine-containing compound is preferably one that is polymerizable by ultraviolet rays. The fluorine-containing compound preferably contains one or both of the —OCF$_2$— chain and the =NCO— chain. The polymerizable composition may contain one or multiple of these fluorine-containing compounds.

The polymerizable composition, particularly a (meth)acrylic polymerizable composition, preferably contains 20 parts by weight or more and 49 parts by weight or less of the monofunctional amide monomer and 0.1 parts by weight or more and 10 parts by weight or less of the fluorine-containing compound. If the polymerizable composition contains less than 0.1 parts by weight of the fluorine-containing compound, the smoothness of the surface of the polymer layer 3 opposite to the substrate 2 may be low. In this case, the load on the projections 4 upon rubbing of the surface may be large, so that the optical member 1 may appear white. Also, the amount of fluorine atoms in the polymer layer 3 decreases and thus the hygroscopicity of the polymer layer 3 increases. As a result, the adhesion between the substrate 2 and the polymer layer 3 may decrease due to hygroscopy. If the polymerizable composition contains more than 10 parts by weight of the fluorine-containing compound, the amount of fluorine atoms in the polymer layer 3 may be large, so that the fluorine atoms may be present in a large amount not only on the surface of the polymer layer 3 opposite to the substrate 2 but also on the surface of the polymer layer 3 adjacent to the substrate 2. This causes the amount of amide groups to be relatively small on the surface of the polymer layer 3 adjacent to the substrate 2, and thus the adhesion between the substrate 2 and the polymer layer 3 may decrease due to hygroscopy. The polymerizable composition more preferably contains 0.5 parts by weight or more and 8 parts by weight or less, still more preferably 1 part by weight or more and 5 parts by weight or less, of the fluorine-containing compound. If the polymerizable composition contains multiple of the fluorine-containing compounds, the sum of the amounts of the fluorine-containing compounds preferably falls within the above range.

The fluorine-containing compound preferably has a fluorine atom concentration of 20 wt % or higher and 50 wt % or lower, more preferably 25 wt % or higher and 45 wt % or lower, still more preferably 30 wt % or higher and 40 wt % or lower. If the fluorine-containing compound has a fluorine atom concentration lower than 20 wt %, the amount of fluorine atoms is small and the fluorine atoms are less likely to be distributed on the surface of the polymer layer 3 opposite to the substrate 2, so that the adhesion between the substrate 2 and the polymer layer 3 may decrease due to hygroscopy. If the fluorine-containing compound has a fluorine atom concentration higher than 50 wt %, the fluorine-containing compound may have a very low polarity and therefore exhibit poor compatibility with the monofunctional amide monomer in the polymerizable composition, causing non-uniform distribution of the fluorine atoms. In this case, the fluorine atoms are less likely to be distributed on the surface of the polymer layer 3 opposite to the substrate 2, so that the adhesion between the substrate 2 and the polymer layer 3 may decrease due to hygroscopy.

The polymer layer 3 may have a single-layer structure or a double-layer structure (e.g., an intermediate layer and a surface layer disclosed in Patent Literature 3). In the case where the polymer layer 3 has a double-layer structure, the fluorine-containing compound may be contained in at least one of the two layers and is preferably contained in one of the two layers which is opposite to the substrate 2 (e.g., the surface layer disclosed in Patent Literature 3). In the case where the polymer layer 3 has a double-layer structure, the amount of each component contained in the polymerizable composition is the sum of the amounts of the component in the respective layers.

The polymerizable composition may appropriately contain additives such as a release agent and a polymerization initiator as well as the monofunctional amide monomer, polyfunctional acrylate, monofunctional acrylate, and fluorine-containing compound described above.

The release agent is added to facilitate removal of a die 6 from the polymer layer 3 in the state shown in FIG. 4(d) described below. Examples of the release agent to be added to the polymerizable composition include a fluorine-based release agent, a silicone-based release agent, and a phosphate-ester-based release agent. Examples of the fluorine-based release agent include the fluorine-containing compounds described above. Examples of the silicone-based release agent include silicone diacrylate. Known examples of silicone diacrylate include a release agent (trade name: EBECRYL350) from Daicel-Allnex Ltd. Examples of the phosphate-ester-based release agent include (poly)oxyethylene alkyl phosphate esters. Known examples of (poly) oxyethylene alkyl phosphate esters include a release agent (trade name: NIKKOL® TDP-2) from Nikko Chemicals Co., Ltd.

Examples of the polymerization initiator include a photo-polymerization initiator. The photo-polymerization initiator is active to active energy rays, and is added so as to initiate a polymerization reaction for polymerizing the monomers. Examples of the photo-polymerization initiator include radical polymerization initiators, anionic polymerization initiators, and cationic polymerization initiators. Examples of such a photo-polymerization initiator include acetophenones such as p-tert-butyltrichloroacetophenone, 2,2'-diethoxyacetophenone, and 2-hydroxy-2-methyl-1-phenylpropan-1-one; ketones such as benzophenone, 4,4'-bisdimethylaminobenzophenone, 2-chlorothioxanthone, 2-methylthioxanthone, 2-ethylthioxanthone, and 2-isopropylthioxanthone; benzoin ethers such as benzoin, benzoin methyl ether, benzoin isopropyl ether, and benzoin isobutyl ether; and benzyl ketals such as benzyl dimethyl ketal and hydroxycyclohexyl phenyl ketone. Known examples of the photo-polymerization initiator include a photo-polymerization initiator (trade name: IRGACURE® 819) from BASF SE and a photo-polymerization initiator (trade name: LUCIRIN® TPO) from BASF SE.

The polymerizable composition, particularly a (meth) acrylic polymerizable composition, preferably contains no solvent. In other words, the polymerizable composition, particularly a (meth)acrylic polymerizable composition, is preferably of solvent-free. In the case where the polymerizable composition ((meth)acrylic polymerizable composition) is of solvent-free, the cost relating to the use of a solvent and environmental load (e.g., bad odor in use) can be reduced. Further, this configuration eliminates the need for a device for drying and removing a solvent, enabling reduction in the cost relating to such a device. In contrast, if the polymerizable composition ((meth)acrylic polymerizable composition) contains a solvent together with a fluorine-containing compound, the solvent may cause the fluorine-containing compound to be excessively mixed and thus cause the fluorine atoms to be less likely to be distributed on the surface of the polymer layer 3 opposite to the substrate 2. Also, if the solvent is insufficiently dried, the adhesion between the substrate 2 and the polymer layer 3 may decrease.

The polymer layer 3 may have any thickness, but preferably has a small thickness in order to achieve a high fluorine atom concentration on the surface of the polymer layer 3 opposite to the substrate 2. In particular, the polymer layer 3 preferably has a thickness of 5.0 μm or greater and 20.0 μm or smaller. The thickness of the polymer layer as used herein means the distance from the surface of the polymer layer adjacent to the substrate to the peak of the projections.

The projections 4 may have any shape tapering toward the tip (a tapered shape) such as a shape consisting of a columnar lower part and a hemispherical upper part (temple-bell-like shape), and a conical shape (cone-like shape, circular-cone-like shape). The projections 4 may also have a shape with branched protrusions. Branched protrusions mean projections which are disposed at an irregular pitch and formed during anodizing and etching to produce a die for moth-eye structure formation. In FIG. 1, the base between adjacent projections 4 has an inclined shape, but may have a horizontal shape without inclination.

The pitch P between adjacent projections 4 may be any value that is not longer than the wavelength of visible light (780 nm). In order to sufficiently prevent optical phenomena such as moiré and iridescence, the pitch P is preferably 100 nm or greater and 400 nm or smaller, more preferably 100 nm or greater and 200 nm or smaller. The pitch between adjacent projections as used herein is measured with a scanning electron microscope (trade name: S-4700) from Hitachi High-Technologies Corp. and means the average distance between every two adjacent projections except for branched projections within a 1-μm-square region in a plane image taken by the scanning electron microscope. The pitch between adjacent projections was measured in the state where an osmium metal film (thickness: 5 nm) of osmium (VIII) oxide from Wako Pure Chemical Industries, Ltd. was formed on the uneven structure using an osmium coater "Neoc-ST" from Meiwafosis Co., Ltd.

The projections 4 may each have any height, but preferably have a height of 50 nm or greater and 600 nm or smaller, more preferably 100 nm or greater and 300 nm or smaller, in order to allow each projection 4 to also have a preferred aspect ratio to be mentioned later. The height of the projections as used herein is measured with a scanning electron microscope (trade name: S-4700) from Hitachi High-Technologies Corp. and means the average height of 10 consecutive projections except for branched projections in a cross-sectional image taken by the scanning electron microscope. The 10 projections are selected so as not to include projections having any defect or deformed portion (e.g., a portion accidentally deformed during preparation of a sample). The sample is taken from a region where the optical member has no specific defect. For example, in the case of an optical member having a roll shape formed by continuous production, a sample is taken from a central region of the roll. The height of the projections was measured in the state where an osmium metal film (thickness: 5 nm) of osmium(VIII) oxide from Wako Pure Chemical Industries, Ltd. was formed on the uneven structure using an osmium coater "Neoc-ST" from Meiwafosis Co., Ltd.

The projections 4 may each have any aspect ratio, but preferably have an aspect ratio of 0.8 or greater and 1.5 or smaller. With the projections 4 each having an aspect ratio of 1.5 or smaller, the processability of the moth-eye structure is sufficiently high and there is less chance of occurrence of sticking and poor transferring conditions in formation of the moth-eye structure (e.g., clogging of die, twining of the material). When the projections 4 each have an aspect ratio of 0.8 or greater, the optical member can sufficiently prevent occurrence of optical phenomena such as moiré and iridescence, achieving favorable reflection characteristics. The aspect ratio of the projections as used herein is represented by the ratio of the height of the projection of interest and the pitch between adjacent projections measured as described above (height/pitch) with a scanning electron microscope (trade name: S-4700) from Hitachi High-Technologies Corp.

The projections 4 may be arranged in any manner, and may be arranged either randomly or regularly. In order to sufficiently prevent occurrence of moiré, the projections 4 are preferably arranged randomly.

As described above, in the present embodiment, the polymer layer 3 has a minimum storage modulus E' of $1 \times 10^8$ Pa or higher and $1 \times 10^9$ Pa or lower at a bottom temperature of 110° C. or higher and 210° C. or lower in a dynamic viscoelasticity measurement with a measurement temperature range of −50° C. to 250° C., a temperature rise rate of 5° C./rain, and a frequency of 10 Hz. This configuration enables the optical member 1 to achieve both the adhesion between the substrate 2 and the polymer layer 3 and the rubbing resistance. Furthermore, since the polymer layer 3 includes on a surface thereof an uneven structure provided with multiple projections 4 at a pitch not longer than a wavelength of visible light, the optical member 1 with excellent antireflective properties can be obtained.

Figure 4:
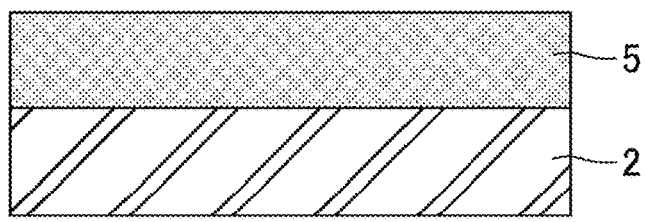
FIG. 4 shows schematic cross-sectional views illustrating a production process of the optical member of the embodiment (steps a to d).
Figure 4:
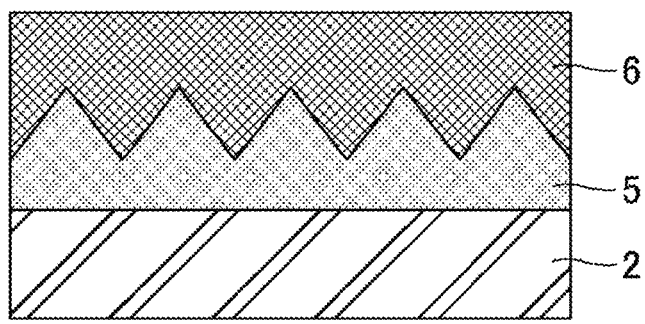
Figure 4:
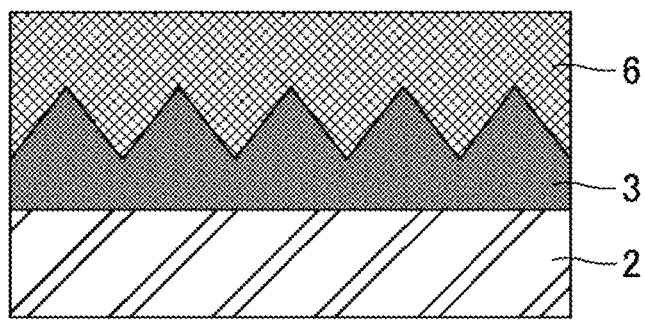
Figure 4:
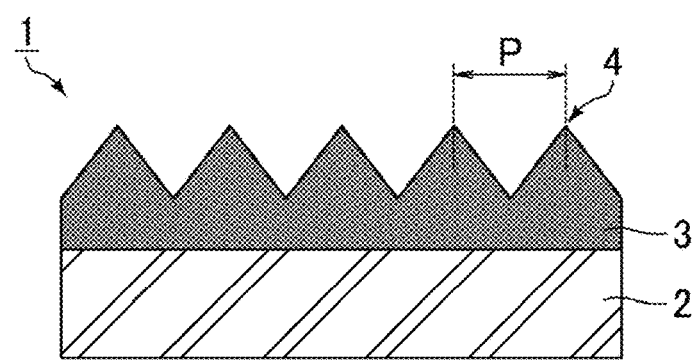

Next, the production process of the optical member of the embodiment is described with reference to FIG. 4. FIG. 4 shows schematic cross-sectional views illustrating a production process of the optical member of the embodiment (steps a to d).

(a) Application of Polymerizable Composition

As shown in FIG. 4(a), the polymerizable composition 5 is applied to a surface of the substrate 2. Thereby, the polymerizable composition 5 formed is in direct contact with the substrate 2. The polymerizable composition 5 may be applied by any technique such as spray coating, gravure coating, or slot-die coating.

(b) Formation of Uneven Structure

As shown in FIG. 4(b), the die 6 is pushed to the surface of the applied polymerizable composition 5 opposite to the substrate 2, whereby the uneven structure is formed on the surface of the polymerizable composition 5 opposite to the substrate 2.

(c) Curing of Polymerizable Composition

The polymerizable composition 5 on which the uneven structure is formed is cured (polymerized). As a result, the polymer layer 3 as shown in FIG. 4(c) is formed. The polymerizable composition 5 is preferably cured (polymerized) by application of active energy rays. The active energy rays may be applied to the polymerizable composition 5 from the substrate 2 side or from the side opposite to the substrate 2. The application of the active energy rays may be performed any times, and may be performed one time or multiple times.

(d) Release of Die

The die 6 is released from the polymer layer 3. As a result, the optical member 1 as shown in FIG. 4(d) is completed. The uneven structure formed on the surface of the polymer layer 3 opposite to the substrate 2 corresponds to a structure provided with multiple projections 4 at a pitch P not longer than a wavelength of visible light, i.e., the moth-eye structure.

The die 6 may be one produced by the following method. First, a film of aluminum that is a material of the die 6 is formed on a support substrate by sputtering. Next, the resulting aluminum layer is repetitively subjected to anodizing and etching. Thereby, a cavity (die 6) of the moth-eye structure can be produced. At this time, the uneven structure of the die 6 can be modified by adjusting the duration of the anodizing and the duration of the etching.

Non-limiting examples of a material of the support substrate include glass; metal materials such as stainless steel and nickel; polyolefinic resins such as polypropylene, polymethylpentene, and cyclic olefinic polymers (typified by norbornene-based resin, e.g., a polymer (trade name: Zeonor®) from Zeon Corp., a polymer (trade name: Afton®) from JSR Corp.; polycarbonate resin; and resin materials such as polyethylene terephthalate, polyethylene naphthalate, and triacetyl cellulose. Instead of the support substrate with an aluminum film formed on the surface, an aluminum substrate may be used.

The die 6 may have any shape such as a flat plate or a roll.

The surface of the die 6 preferably has undergone treatment with a release agent. In other words, the die 6 preferably has undergone release treatment. The release treatment on the die 6 allows the die 6 to be removed easily from the polymer layer 3 in the above step (d). The release treatment on the die 6 makes the surface energy of the die 6 low. Thus, when the die 6 is pushed to the polymerizable composition 5 containing the fluorine-containing compound in the above step (b), the fluorine atoms can efficiently be distributed on the surface of the polymerizable composition 5 opposite to the substrate 2. This treatment can also prevent early removal of the fluorine atoms from the surface of the polymerizable composition 5 opposite to the substrate 2 before curing of the polymerizable composition 5. As a result, in the optical member 1, the fluorine atoms can efficiently be distributed on the surface of the polymer layer 3 opposite to the substrate 2.

Examples of the release agent to be applied to the die 6 include fluorine-based, silicone-based, and phosphate-ester-based release agents. Preferred are fluorine-based release agents. In the case where a fluorine-based release agent is used to perform release treatment on the die 6 while the polymerizable composition 5 contains the fluorine-containing compound, the fluorine-based release agent strongly interacts with the fluorine-containing compound to cause the fluorine atoms to be more efficiently distributed on the surface of the polymerizable composition 5 opposite to the substrate 2. Known examples of the fluorine-based release agent include a fluorine-based release agent (Optool AES4) from Daikin Industries, Ltd.

In the production process described above, the steps (a) to (d) can be performed in a continuous, efficient manner with, for example, the substrate 2 having a roll shape.

Hereinafter, the present invention is described in more detail based on examples and comparative examples. The examples, however, are not intended to limit the scope of the present invention.

Example 1

An optical member of Example 1 was produced through the following production process.

(a) Application of Polymerizable Composition

The polymerizable composition 5 was applied to a surface of the substrate 2 with a bar coater (trade name: No. 05) from Daiichi Rika Co., Ltd. The polymerizable composition 5 formed was in direct contact with the substrate 2.

The substrate 2 used was a triacetyl cellulose film (trade name: TAC-TD80U) from Fujifilm Corp. The substrate 2 had a thickness of 80 μm.

The polymerizable composition 5 used was a mixture of a monofunctional amide monomer, a polyfunctional acrylate, a fluorine-containing compound, and a polymerization initiator which are listed below. The numerical value following each material indicates the amount of the material. The polymerizable composition 5 was a (meth)acrylic polymerizable composition and of solvent-free.

<Monofunctional Amide Monomer>

N,N-Dimethylacrylamide: 29 parts by weight

The N,N-dimethylacrylamide used was a monofunctional amide monomer (trade name: DMAA) from KJ Chemicals Corp.

<Polyfunctional Acrylate>

Urethane acrylate: 21 parts by weight

The urethane acrylate used was a polyfunctional acrylate (trade name: U-10PA) from Shin Nakamura Chemical Co., Ltd.

Ethoxylated pentaerythritol tetraacrylate: 48 parts by weight

The ethoxylated pentaerythritol tetraacrylate used was a polyfunctional acrylate (trade name: ATM-35E) from Shin Nakamura Chemical Co., Ltd.

<Fluorine-Containing Compound>

A fluorine-containing compound produced by the following method was used. A separable flask (volume: 300 ml) equipped with an agitator, a thermometer, a nitrogen inlet, and a condenser was charged with butyl acetate (100 parts by weight). The separable flask was heated in a nitrogen atmosphere. Into the separable flask was dropped a mixture of the following materials over three hours while the inside temperature of the flask was maintained at 110° C.

2-Perfluorohexylethyl acrylate: 50 parts by weight

The 2-perfluorohexylethyl acrylate used was a fluorine-containing monomer (trade name: CHEMINOX FAAC-6) from Unimatec Co., Ltd.

4-Hydroxybutyl acrylate: 40 parts by weight

The 4-hydroxybutyl acrylate used was a monofunctional acrylate (trade name: 4HBA) from Nippon Kasei Chemical Co., Ltd.

2-Hydroxyethyl methacrylate: 10 parts by weight

The 2-hydroxyethyl methacrylate used was a monofunctional acrylate (trade name: 2HEMA) from Nippon Shokubai Co., Ltd.

Radical polymerization initiator: 3.5 parts by weight

The radical polymerization initiator used was a polymerization initiator (trade name: V-601) from Wako Pure Chemical Industries, Ltd.

To the reaction solution obtained after completion of the dropping was further added the same radical polymerization initiator as above (0.1 parts by weight) and reacted for five hours. The following materials were added to the resulting resin in a molten state, and the mixture was reacted at a temperature of 70° C. for two hours.

2-Isocyanatoethyl acrylate: 5 parts by weight

The 2-isocyanatoethyl acrylate used was a monomer (trade name: Karenz AOI®) from Showa Denko K.K.

1,8-Diazabicyclo[5.4.0]-7-undecene: 0.3 parts by weight

The 1,8-diazabicyclo[5.4.0]-7-undecene used was a catalyst (product code: D1270) from Tokyo Chemical Industry Co., Ltd.

4-Methoxyphenol: 0.1 parts by weight

The 4-methoxyphenol used was a polymerization inhibitor (product code: M0123) from Tokyo Chemical Industry Co., Ltd.

After the reaction, solvent displacement was performed for butyl acetate and N,N-dimethyacrylamide using a rotary evaporator (trade name: N-1110 series) from Tokyo Rikakikai Co, Ltd. The solution was then heated in a mini jet oven (trade name: MD-92) from Toyama Sangyo Co., Ltd. at a temperature of 180° C. for five hours. The heating was followed by addition of N,N-dimethylacrylamide, so that a solution (fluorine-containing compound solution) whose solids content (fluorine-containing compound) was controlled to 50% was produced.

In the present example, the polymerizable composition 5 contained 2 parts by weight of the obtained fluorine-containing compound solution, i.e., 1 part by weight of the fluorine-containing compound in terms of the solids content. Also, as is clear from the above statements, the polymerizable composition 5 contained 1 part by weight of N,N-dimethylacrylamide in the fluorine-containing compound solution. In other words, the polymerizable composition 5 contained a total of 30 parts by weight of the monofunctional amide monomer (the sum of N,N-dimethylacrylamide contained as the monofunctional amide monomer (29 parts by weight) and N,N-dimethylacrylamide in the fluorine-containing compound solution (1 part by weight)). The fluorine-containing compound had a weight average molecular weight of 3700 and had a fluorine atom concentration of 38 wt %. Here, the weight average molecular weight and fluorine atom concentration in the fluorine-containing compound were measured by the following methods. These measurements were performed after measuring the weight of the fluorine-containing compound before and after the heating mentioned above.

(Weight Average Molecular Weight of Fluorine-Containing Compound)

The polystyrene-equivalent weight average molecular weight of the fluorine-containing compound was calculated by gel permeation chromatography (GPC). The device used and the conditions were as follows. The molecular weight calibration curve was created relative to polystyrene standards.

Device used: chromatograph (trade name: SHODEX GPC SYSTEM-11) from Showa Denko K.K.

Column: column (trade name: TSKgel a MXL) from Tosoh Corporation×3

Measurement temperature: 40° C.

Sample solution: 0.10% dimethylformamide solution of surface treatment pigment containing thermally decomposable polar group Amount fed: 100 ml Detector: refractive index detector (Fluorine Atom Concentration in Fluorine-Containing Compound)

A photo-polymerization initiator (trade name: LUCIRIN TPO) from BASF SE (0.5 parts by weight) was added to the fluorine-containing compound solution (100 parts by weight) and dissolved in the solution by stirring. The obtained solution was poured into a cylindrical frame (diameter: 30 mm, thickness: 1 mm) made of polytetrafluoroethylene (PTFE), followed by application of ultraviolet rays (dose: 1 J/cm$^2$) to produce a cylindrical cured film. Using a tube-above wavelength dispersive X-ray fluorescence spectrometer (trade name: ZSX Primus) from Rigaku Corporation, the energy intensity of fluorine atoms in the cured film (fluorine-containing compound concentration: 50%) was measured with an accelerating voltage of 50 kV and a current of 60 mA, so that the fluorine atom concentration in the fluorine-containing compound was determined.

<Polymerization Initiator>

Photo-polymerization initiator: 0.5 parts by weight

The photo-polymerization initiator used was a photo-polymerization initiator (trade name: LUCIRIN TPO) from BASF SE.

(b) Formation of Uneven Structure

The die 6 was pushed to the surface of the applied polymerizable composition 5 opposite to the substrate 2 while entry of air bubbles was avoided, whereby the uneven structure was formed on the surface of the polymerizable composition 5 opposite to the substrate 2.

The die 6 used was one produced by the following method. First, a film of aluminum that is a material of the die 6 was formed on a surface of a 10-cm-square glass substrate by sputtering. The thickness of the resulting aluminum layer was 1.0 μm. Next, the resulting aluminum layer was repetitively subjected to anodizing and etching. Thereby, an anodizing layer was formed with many fine pores (recesses) (distance between the bottom points of adjacent pores was not longer than the wavelength of visible light). Specifically, anodizing, etching, anodizing, etching, anodizing, etching, anodizing, etching, and anodizing were performed successively (anodizing: 5 times, etching: 4 times), so that many fine pores (recesses) were formed each tapering toward the inside of the aluminum (a tapered shape). As a result, a die 6 having an uneven structure was obtained. The anodizing was performed using oxalic acid (concentration: 0.03 wt %) at a liquid temperature of 5° C. and an applied voltage of 80 V. The duration of a single anodizing process was 25 seconds. The etching was performed using phosphoric acid (concentration: 1 mol/l) at a liquid temperature of 30° C. The duration of a single etching process was 25 minutes. The die 6 was found to have a projection height of 290 nm by scanning electron microscopic observation. The surface of the die 6 was subjected to release treatment with a fluorine-based release agent (trade name: Optool AES4) from Daikin Industries, Ltd. in advance.

(c) Curing of Polymerizable Composition

The polymerizable composition 5 on which the uneven structure was formed was cured (polymerized) by application of ultraviolet rays from the substrate 2 side. Thereby, the polymer layer 3 was formed. The ultraviolet rays were applied under two conditions, namely a condition with a dose of 1 J/cm$^2$ (hereinafter, also referred to as Condition 1) and a condition with a dose of 0.5 J/cm$^2$ (hereinafter, also referred to as Condition 2). The specifications of the polymer layer 3 in Condition 1 were as follows.

Thickness: 9.8 μm
Amide group concentration in polymer layer 3: 3.02 mmol/g
Bottom temperature: 178° C.
Minimum storage modulus E': 2.4×10$^8$ Pa The measurement sample used for storage modulus E' was a cured product (polymer layer 3) having a square cross-sectional shape (length: 35 mm, width: 5 mm, thickness: 1 mm) obtained by applying ultraviolet rays (dose: 1 J/cm$^2$, corresponding to Condition 1) to the polymerizable composition 5. The storage modulus E' was measured with each end of the measurement sample clamped. The length of the portion not clamped was 20 mm.

(d) Release of Die

The die 6 was released from the polymer layer 3. As a result, the optical member 1 was completed. The surface specifications of the optical member 1 were as follows.

Shape of projections 4: temple-bell-like shape
Pitch P between adjacent projections 4: 200 nm
Height of projection 4: 200 nm
Aspect ratio of projection 4: 1

Example 2

An optical member was produced as in Example 1, except that the composition of the monofunctional amide monomer and the composition of the polyfunctional acrylate were changed as follows.
<Monofunctional Amide Monomer>
N,N-Dimethylacrylamide: 38 parts by weight
<Polyfunctional Acrylate>
Urethane acrylate: 16 parts by weight
Ethoxylated pentaerythritol tetraacrylate: 44 parts by weight The polymerizable composition 5 contained a total of 39 parts by weight of the monofunctional amide monomer (the sum of N,N-dimethylacrylamide contained as the monofunctional amide monomer (38 parts by weight) and N,N-dimethylacrylamide in the fluorine-containing compound solution (1 part by weight)).

The specifications of the polymer layer 3 were as follows.
Amide group concentration in polymer layer 3: 3.92 mmol/g
Bottom temperature: 180° C.
Minimum storage modulus E': 2.1×10$^8$ Pa Example 3

An optical member was produced as in Example 1, except that the composition of the monofunctional amide monomer and the composition of the polyfunctional acrylate were changed as follows.
<Monofunctional Amide Monomer>
N,N-Dimethylacrylamide: 24 parts by weight
<Polyfunctional Acrylate>
Urethane acrylate: 23 parts by weight
Ethoxylated pentaerythritol tetraacrylate: 51 parts by weight The polymerizable composition 5 contained a total of 25 parts by weight of the monofunctional amide monomer (the sum of N,N-dimethylacrylamide contained as the monofunctional amide monomer (24 parts by weight) and N,N-dimethylacrylamide in the fluorine-containing compound solution (1 part by weight)).

The specifications of the polymer layer 3 were as follows.
Amide group concentration in polymer layer 3: 2.51 mmol/g
Bottom temperature: 175° C.
Minimum storage modulus E': 2.6×10$^8$ Pa Example 4

An optical member was produced as in Example 1, except that the composition of the monofunctional amide monomer and the composition of the polyfunctional acrylate were changed as follows.
<Monofunctional Amide Monomer>
N,N-Dimethylacrylamide: 19 parts by weight
<Polyfunctional Acrylate>
Urethane acrylate: 25 parts by weight
Ethoxylated pentaerythritol tetraacrylate: 54 parts by weight The polymerizable composition 5 contained a total of 20 parts by weight of the monofunctional amide monomer (the sum of N,N-dimethylacrylamide contained as the monofunctional amide monomer (19 parts by weight) and N,N-dimethylacrylamide in the fluorine-containing compound solution (1 part by weight)).

The specifications of the polymer layer 3 were as follows.
Amide group concentration in polymer layer 3: 2.01 mmol/g
Bottom temperature: 169° C.
Minimum storage modulus E': 2.9×10$^8$ Pa Example 5

An optical member was produced as in Example 1, except that the composition of the monofunctional amide monomer and the composition of the polyfunctional acrylate were changed as follows.
<Monofunctional Amide Monomer>
N,N-Dimethylacrylamide: 43 parts by weight
<Polyfunctional Acrylate>
Urethane acrylate: 14 parts by weight
Ethoxylated pentaerythritol tetraacrylate: 41 parts by weight The polymerizable composition 5 contained a total of 44 parts by weight of the monofunctional amide monomer (the sum of N,N-dimethylacrylamide contained as the monofunctional amide monomer (43 parts by weight) and N,N-dimethylacrylamide in the fluorine-containing compound solution (1 part by weight)).

The specifications of the polymer layer 3 were as follows.

Amide group concentration in polymer layer 3: 4.42 mmol/g

Bottom temperature: 190° C.

Minimum storage modulus E': $1.8 \times 10^8$ Pa

Example 6

An optical member was produced as in Example 1, except that the composition of the monofunctional amide monomer and the composition of the polyfunctional acrylate were changed as follows.

<Monofunctional Amide Monomer>

N,N-Dimethylacrylamide: 48 parts by weight

<Polyfunctional Acrylate>

Urethane acrylate: 12 parts by weight

Ethoxylated pentaerythritol tetraacrylate: 38 parts by weight

The polymerizable composition 5 contained a total of 49 parts by weight of the monofunctional amide monomer (the sum of N,N-dimethylacrylamide contained as the monofunctional amide monomer (48 parts by weight) and N,N-dimethylacrylamide in the fluorine-containing compound solution (1 part by weight)).

The specifications of the polymer layer 3 were as follows.

Amide group concentration in polymer layer 3: 4.92 mmol/g

Bottom temperature: 204° C.

Minimum storage modulus E': $1.1 \times 10^8$ Pa

Example 7

An optical member was produced as in Example 1, except that the composition of the polyfunctional acrylate was changed as follows.

<Polyfunctional Acrylate>

Urethane acrylate: 10 parts by weight

The urethane acrylate used was urethane acrylate (trade name: UA-306H) from Kyoeisha Chemical Co., Ltd.

Alkoxylated dipentaerythritol polyacrylate: 59 parts by weight

The alkoxylated dipentaerythritol polyacrylate used was a polyfunctional acrylate (trade name: KAYARAD DPEA-12) from Nippon Kayaku Co., Ltd.

The specifications of the polymer layer 3 were as follows.

Amide group concentration in polymer layer 3: 3.02 mmol/g

Bottom temperature: 192° C.

Minimum storage modulus E': $2.8 \times 10^8$ Pa

Example 8

An optical member was produced as in Example 1, except that the composition of the polyfunctional acrylate was changed as follows.

<Polyfunctional Acrylate>

Urethane acrylate: 10 parts by weight

The urethane acrylate used was urethane acrylate (trade name: UA-306H) from Kyoeisha Chemical Co., Ltd.

Alkoxylated dipentaerythritol polyacrylate: 53 parts by weight

The alkoxylated dipentaerythritol polyacrylate used was a polyfunctional acrylate (trade name: KAYARAD DPEA-12) from Nippon Kayaku Co., Ltd.

Pentaerythritol triacrylate: 6 parts by weight

The pentaerythritol triacrylate used was a polyfunctional acrylate (trade name: A-TMM-3LM-N) from Shin Nakamura Chemical Co., Ltd.

The specifications of the polymer layer 3 were as follows.

Amide group concentration in polymer layer 3: 3.02 mmol/g

Bottom temperature: 209° C.

Minimum storage modulus E': $2.6 \times 10^8$ Pa

Example 9

An optical member was produced as in Example 1, except that the composition of the polyfunctional acrylate was changed as follows.

<Polyfunctional Acrylate>

Alkoxylated dipentaerythritol polyacrylate: 69 parts by weight

The alkoxylated dipentaerythritol polyacrylate used was a polyfunctional acrylate (trade name: KAYARAD DPEA-12) from Nippon Kayaku Co., Ltd.

The specifications of the polymer layer 3 were as follows.

Amide group concentration in polymer layer 3: 3.02 mmol/g

Bottom temperature: 170° C.

Minimum storage modulus E': $1.5 \times 10^8$ Pa

Example 10

An optical member was produced as in Example 1, except that the composition of the polyfunctional acrylate was changed as follows.

<Polyfunctional Acrylate>

Alkoxylated dipentaerythritol polyacrylate: 59 parts by weight

The alkoxylated dipentaerythritol polyacrylate used was a polyfunctional acrylate (trade name: KAYARAD DPEA-12) from Nippon Kayaku Co., Ltd.

Dipentaerythritol hexaacrylate: 10 parts by weight

The dipentaerythritol hexaacrylate used was a polyfunctional acrylate (trade name: Light Acrylate DPE-6A) from Kyoeisha Chemical Co., Ltd.

The specifications of the polymer layer 3 were as follows.

Amide group concentration in polymer layer 3: 3.02 mmol/g

Bottom temperature: 200° C.

Minimum storage modulus E': $1.8 \times 10^8$ Pa

Example 11

An optical member was produced as in Example 1, except that the composition of the polyfunctional acrylate was changed as follows and a monofunctional acrylate was further added.

<Polyfunctional Acrylate>

Alkoxylated dipentaerythritol polyacrylate: 65 parts by weight

The alkoxylated dipentaerythritol polyacrylate used was a polyfunctional acrylate (trade name: KAYARAD DPEA-12) from Nippon Kayaku Co., Ltd.

<Monofunctional Acrylate>

4-Hydroxybutyl acrylate: 4 parts by weight

The 4-hydroxybutyl acrylate used was a monofunctional acrylate (trade name: 4HBA) from Nippon Kasei Chemical Co., Ltd.

The specifications of the polymer layer 3 were as follows.
Amide group concentration in polymer layer 3: 3.02 mmol/g
Bottom temperature: 167° C.
Minimum storage modulus E': 1.1×10$^8$ Pa Example 12

An optical member was produced as in Example 1, except that the composition of the monofunctional amide monomer, the composition of the polyfunctional acrylate, and the composition of the fluorine-containing compound were changed as follows.
<Monofunctional Amide Monomer>
  N,N-Dimethylacrylamide: 22 parts by weight
<Polyfunctional Acrylate>
  Urethane acrylate: 27 parts by weight
  Ethoxylated pentaerythritol tetraacrylate: 25 parts by weight
  Mixture of tripentaerythritol acrylate, mono- and di-pentaerythritol acrylates, and polypentaerythritol acrylate: 25 parts by weight
  The mixture of tripentaerythritol acrylate, mono- and di-pentaerythritol acrylates, and polypentaerythritol acrylate used was a polyfunctional acrylate (trade name: Viscoat #802) from Osaka Organic Chemical Industry Ltd.
<Fluorine-containing compound>: 0.5 parts by weight
  In the present example, a fluorine-containing compound solution was produced by adding 0.5 parts by weight of N,N-dimethylacrylamide to 0.5 parts by weight of a fluorine-containing compound. To the polymerizable composition 5 was added 1 part by weight of the obtained fluorine-containing compound solution, i.e., 0.5 parts by weight of the fluorine-containing compound in terms of the solids content. The polymerizable composition 5 contained a total of 22.5 parts by weight of the monofunctional amide monomer (the sum of N,N-dimethylacrylamide contained as the monofunctional amide monomer (22 parts by weight) and N,N-dimethylacrylamide in the fluorine-containing compound solution (0.5 parts by weight)).
  The specifications of the polymer layer 3 were as follows.
  Amide group concentration in polymer layer 3: 2.26 mmol/g
  Bottom temperature: 178° C.
  Minimum storage modulus E': 7.6×10$^8$ Pa Example 13

An optical member was produced as in Example 1, except that the composition of the monofunctional amide monomer, the composition of the polyfunctional acrylate, and the composition of the fluorine-containing compound were changed as follows.
<Monofunctional Amide Monomer>
  N,N-Dimethylacrylamide: 21 parts by weight
<Polyfunctional Acrylate>
  Urethane acrylate: 27 parts by weight
  Ethoxylated pentaerythritol tetraacrylate: 24 parts by weight
  Mixture of tripentaerythritol acrylate, mono- and di-pentaerythritol acrylates, and polypentaerythritol acrylate: 27 parts by weight
  The mixture of tripentaerythritol acrylate, mono- and di-pentaerythritol acrylates, and polypentaerythritol acrylate used was a polyfunctional acrylate (trade name: Viscoat #802) from Osaka Organic Chemical Industry Ltd.
<Fluorine-containing compound>: 0.5 parts by weight
  In the present example, a fluorine-containing compound solution was produced by adding 0.5 parts by weight of N,N-dimethylacrylamide to 0.5 parts by weight of a fluorine-containing compound. To the polymerizable composition 5 was added 1 part by weight of the obtained fluorine-containing compound solution, i.e., 0.5 parts by weight of the fluorine-containing compound in terms of the solids content. The polymerizable composition 5 contained a total of 21.5 parts by weight of the monofunctional amide monomer (the sum of N,N-dimethylacrylamide contained as the monofunctional amide monomer (21 parts by weight) and N,N-dimethylacrylamide in the fluorine-containing compound solution (0.5 parts by weight)).
  The specifications of the polymer layer 3 were as follows.
  Amide group concentration in polymer layer 3: 2.16 mmol/g
  Bottom temperature: 195° C.
  Minimum storage modulus E': 8.2×10$^8$ Pa Example 14

An optical member was produced as in Example 1, except that the composition of the monofunctional amide monomer, the composition of the polyfunctional acrylate, and the composition of the fluorine-containing compound were changed as follows.
<Monofunctional Amide Monomer>
  N,N-Dimethylacrylamide: 20 parts by weight
<Polyfunctional Acrylate>
  Urethane acrylate: 29 parts by weight
  Ethoxylated pentaerythritol tetraacrylate: 23 parts by weight
  Mixture of tripentaerythritol acrylate, mono- and di-pentaerythritol acrylates, and polypentaerythritol acrylate: 27 parts by weight
  The mixture of tripentaerythritol acrylate, mono- and di-pentaerythritol acrylates, and polypentaerythritol acrylate used was a polyfunctional acrylate (trade name: Viscoat #802) from Osaka Organic Chemical Industry Ltd.
<Fluorine-containing compound>: 0.5 parts by weight
  In the present example, a fluorine-containing compound solution was produced by adding 0.5 parts by weight of N,N-dimethylacrylamide to 0.5 parts by weight of a fluorine-containing compound. To the polymerizable composition 5 was added 1 part by weight of the obtained fluorine-containing compound solution, i.e., 0.5 parts by weight of the fluorine-containing compound in terms of the solids content. The polymerizable composition 5 contained a total of 20.5 parts by weight of the monofunctional amide monomer (the sum of N,N-dimethylacrylamide contained as the monofunctional amide monomer (20 parts by weight) and N,N-dimethylacrylamide in the fluorine-containing compound solution (0.5 parts by weight)).
  The specifications of the polymer layer 3 were as follows.
  Amide group concentration in polymer layer 3: 2.06 mmol/g
  Bottom temperature: 209° C.
  Minimum storage modulus E': 9.7×10$^8$ Pa Example 15

An optical member was produced as in Example 1, except that the composition of the monofunctional amide monomer, the composition of the polyfunctional acrylate, and the composition of the fluorine-containing compound were changed as follows.

<Monofunctional Amide Monomer>
    N,N-Dimethylacrylamide: 21 parts by weight
<Polyfunctional Acrylate>
    Urethane acrylate: 15 parts by weight
    Ethoxylated polyglycerin polyacrylate: 63 parts by weight
    The ethoxylated polyglycerin polyacrylate used was a polyfunctional acrylate (trade name: NK ECONOMER A-PG5027E) from Shin Nakamura Chemical Co., Ltd.
<Fluorine-containing compound>: 0.5 parts by weight
    In the present example, a fluorine-containing compound solution was produced by adding 0.5 parts by weight of N,N-dimethylacrylamide to 0.5 parts by weight of a fluorine-containing compound. To the polymerizable composition 5 was added 1 part by weight of the obtained fluorine-containing compound solution, i.e., 0.5 parts by weight of the fluorine-containing compound in terms of the solids content. The polymerizable composition 5 contained a total of 21.5 parts by weight of the monofunctional amide monomer (the sum of N,N-dimethylacrylamide contained as the monofunctional amide monomer (21 parts by weight) and N,N-dimethylacrylamide in the fluorine-containing compound solution (0.5 parts by weight)).
    The specifications of the polymer layer 3 were as follows.
    Amide group concentration in polymer layer 3: 2.16 mmol/g
    Bottom temperature: 142° C.
    Minimum storage modulus E': $2.4 \times 10^8$ Pa Example 16

An optical member was produced as in Example 1, except that the composition of the monofunctional amide monomer, the composition of the polyfunctional acrylate, and the composition of the fluorine-containing compound were changed as follows.
<Monofunctional Amide Monomer>
    N,N-Dimethylacrylamide: 20 parts by weight
<Polyfunctional Acrylate>
    Urethane acrylate: 14 parts by weight
    Ethoxylated polyglycerin polyacrylate: 65 parts by weight
    The ethoxylated polyglycerin polyacrylate used was a polyfunctional acrylate (trade name: NK ECONOMER A-PG5027E) from Shin Nakamura Chemical Co., Ltd.
<Fluorine-containing compound>: 0.5 parts by weight
    In the present example, a fluorine-containing compound solution was produced by adding 0.5 parts by weight of N,N-dimethylacrylamide to 0.5 parts by weight of a fluorine-containing compound. To the polymerizable composition 5 was added 1 part by weight of the obtained fluorine-containing compound solution, i.e., 0.5 parts by weight of the fluorine-containing compound in terms of the solids content. The polymerizable composition 5 contained a total of 20.5 parts by weight of the monofunctional amide monomer (the sum of N,N-dimethylacrylamide contained as the monofunctional amide monomer (20 parts by weight) and N,N-dimethylacrylamide in the fluorine-containing compound solution (0.5 parts by weight)).
    The specifications of the polymer layer 3 were as follows.
    Amide group concentration in polymer layer 3: 2.06 mmol/g
    Bottom temperature: 125° C.
    Minimum storage modulus E': $1.6 \times 10^8$ Pa Example 17

An optical member was produced as in Example 1, except that the composition of the monofunctional amide monomer, the composition of the polyfunctional acrylate, and the composition of the fluorine-containing compound were changed as follows.
<Monofunctional Amide Monomer>
    N,N-Dimethylacrylamide: 20 parts by weight
<Polyfunctional Acrylate>
    Mixture of tripentaerythritol acrylate, mono- and di-pentaerythritol acrylates, and polypentaerythritol acrylate: 13 parts by weight
    The mixture of tripentaerythritol acrylate, mono- and di-pentaerythritol acrylates, and polypentaerythritol acrylate used was a polyfunctional acrylate (trade name: Viscoat #802) from Osaka Organic Chemical Industry Ltd.
    Ethoxylated polyglycerin polyacrylate: 66 parts by weight
    The ethoxylated polyglycerin polyacrylate used was a polyfunctional acrylate (trade name: NK ECONOMER A-PG5027E) from Shin Nakamura Chemical Co., Ltd.
<Fluorine-containing compound>: 0.5 parts by weight
    In the present example, a fluorine-containing compound solution was produced by adding 0.5 parts by weight of N,N-dimethylacrylamide to 0.5 parts by weight of a fluorine-containing compound. To the polymerizable composition 5 was added 1 part by weight of the obtained fluorine-containing compound solution, i.e., 0.5 parts by weight of the fluorine-containing compound in terms of the solids content. The polymerizable composition 5 contained a total of 20.5 parts by weight of the monofunctional amide monomer (the sum of N,N-dimethylacrylamide contained as the monofunctional amide monomer (20 parts by weight) and N,N-dimethylacrylamide in the fluorine-containing compound solution (0.5 parts by weight)).
    The specifications of the polymer layer 3 were as follows.
    Amide group concentration in polymer layer 3: 2.06 mmol/g
    Bottom temperature: 112° C.
    Minimum storage modulus E': $1.1 \times 10^8$ Pa Example 18

An optical member was produced as in Example 1, except that the composition of the monofunctional amide monomer, the composition of the polyfunctional acrylate, and the composition of the fluorine-containing compound were changed as follows.
<Monofunctional Amide Monomer>
    N,N-Dimethylacrylamide: 30 parts by weight
<Polyfunctional Acrylate>
    Urethane acrylate: 21 parts by weight
    Ethoxylated pentaerythritol tetraacrylate: 49 parts by weight
<Fluorine-containing compound>: 0 parts by weight
    The specifications of the polymer layer 3 were as follows.
    Amide group concentration in polymer layer 3: 3.02 mmol/g
    Bottom temperature: 179° C.
    Minimum storage modulus E': $2.3 \times 10^8$ Pa Example 19

An optical member was produced as in Example 1, except that the composition of the monofunctional amide monomer, the composition of the polyfunctional acrylate, and the composition of the fluorine-containing compound were changed as follows.

<Monofunctional Amide Monomer>
  N,N-Dimethylacrylamide: 29.9 parts by weight
<Polyfunctional Acrylate>
  Urethane acrylate: 21 parts by weight
  Ethoxylated pentaerythritol tetraacrylate: 48.9 parts by weight
<Fluorine-containing compound>: 0.1 parts by weight In the present example, a fluorine-containing compound solution was produced by adding 0.1 parts by weight of N,N-dimethylacrylamide to 0.1 parts by weight of a fluorine-containing compound. To the polymerizable composition 5 was added 0.2 parts by weight of the obtained fluorine-containing compound solution, i.e., 0.1 parts by weight of the fluorine-containing compound in terms of the solids content. The polymerizable composition 5 contained a total of 30 parts by weight of the monofunctional amide monomer (the sum of N,N-dimethylacrylamide contained as the monofunctional amide monomer (29.9 parts by weight) and N,N-dimethylacrylamide in the fluorine-containing compound solution (0.1 parts by weight)).

The specifications of the polymer layer 3 were as follows.
  Amide group concentration in polymer layer 3: 3.02 mmol/g
  Bottom temperature: 180° C.
  Minimum storage modulus E': $2.3 \times 10^8$ Pa Example 20

An optical member was produced as in Example 1, except that the composition of the monofunctional amide monomer, the composition of the polyfunctional acrylate, and the composition of the fluorine-containing compound were changed as follows.
<Monofunctional Amide Monomer>
  N,N-Dimethylacrylamide: 29.5 parts by weight
<Polyfunctional Acrylate>
  Urethane acrylate: 21 parts by weight
  Ethoxylated pentaerythritol tetraacrylate: 48.5 parts by weight
<Fluorine-containing compound>: 0.5 parts by weight In the present example, a fluorine-containing compound solution was produced by adding 0.5 parts by weight of N,N-dimethylacrylamide to 0.5 parts by weight of a fluorine-containing compound. To the polymerizable composition 5 was added 1 part by weight of the obtained fluorine-containing compound solution, i.e., 0.5 parts by weight of the fluorine-containing compound in terms of the solids content. The polymerizable composition 5 contained a total of 30 parts by weight of the monofunctional amide monomer (the sum of N,N-dimethylacrylamide contained as the monofunctional amide monomer (29.5 parts by weight) and N,N-dimethylacrylamide in the fluorine-containing compound solution (0.5 parts by weight)).

The specifications of the polymer layer 3 were as follows.
  Amide group concentration in polymer layer 3: 3.02 mmol/g
  Bottom temperature: 180° C.
  Minimum storage modulus E': $2.5 \times 10^8$ Pa Example 21

An optical member was produced as in Example 1, except that the composition of the monofunctional amide monomer, the composition of the polyfunctional acrylate, and the composition of the fluorine-containing compound were changed as follows.

<Monofunctional Amide Monomer>
  N,N-Dimethylacrylamide: 25 parts by weight
<Polyfunctional Acrylate>
  Urethane acrylate: 20 parts by weight
  Ethoxylated pentaerythritol tetraacrylate: 45 parts by weight
<Fluorine-containing compound>: 5 parts by weight In the present example, a fluorine-containing compound solution was produced by adding 5 parts by weight of N,N-dimethylacrylamide to 5 parts by weight of a fluorine-containing compound. To the polymerizable composition 5 was added 10 parts by weight of the obtained fluorine-containing compound solution, i.e., 5 parts by weight of the fluorine-containing compound in terms of the solids content. The polymerizable composition 5 contained a total of 30 parts by weight of the monofunctional amide monomer (the sum of N,N-dimethylacrylamide contained as the monofunctional amide monomer (25 parts by weight) and N,N-dimethylacrylamide in the fluorine-containing compound solution (5 parts by weight)).

The specifications of the polymer layer 3 were as follows.
  Amide group concentration in polymer layer 3: 3.02 mmol/g
  Bottom temperature: 178° C.
  Minimum storage modulus E': $2.3 \times 10^8$ Pa Example 22

An optical member was produced as in Example 1, except that the composition of the monofunctional amide monomer, the composition of the polyfunctional acrylate, and the composition of the fluorine-containing compound were changed as follows.
<Monofunctional Amide Monomer>
  N,N-Dimethylacrylamide: 22 parts by weight
<Polyfunctional Acrylate>
  Urethane acrylate: 19 parts by weight
  Ethoxylated pentaerythritol tetraacrylate: 43 parts by weight
<Fluorine-containing compound>: 8 parts by weight In the present example, a fluorine-containing compound solution was produced by adding 8 parts by weight of N,N-dimethylacrylamide to 8 parts by weight of a fluorine-containing compound. To the polymerizable composition 5 was added 16 parts by weight of the obtained fluorine-containing compound solution, i.e., 8 parts by weight of the fluorine-containing compound in terms of the solids content. The polymerizable composition 5 contained a total of 30 parts by weight of the monofunctional amide monomer (the sum of N,N-dimethylacrylamide contained as the monofunctional amide monomer (22 parts by weight) and N,N-dimethylacrylamide in the fluorine-containing compound solution (8 parts by weight)).

The specifications of the polymer layer 3 were as follows.
  Amide group concentration in polymer layer 3: 3.02 mmol/g
  Bottom temperature: 178° C.
  Minimum storage modulus E': $2.1 \times 10^8$ Pa Example 23

An optical member was produced as in Example 1, except that the composition of the monofunctional amide monomer, the composition of the polyfunctional acrylate, and the composition of the fluorine-containing compound were changed as follows.

<Monofunctional Amide Monomer>
  N,N-Dimethylacrylamide: 20 parts by weight
<Polyfunctional Acrylate>
  Urethane acrylate: 18 parts by weight
  Ethoxylated pentaerythritol tetraacrylate: 42 parts by weight
<Fluorine-containing compound>: 10 parts by weight In the present example, a fluorine-containing compound solution was produced by adding 10 parts by weight of N,N-dimethylacrylamide to 10 parts by weight of a fluorine-containing compound. To the polymerizable composition 5 was added 20 parts by weight of the obtained fluorine-containing compound solution, i.e., 10 parts by weight of the fluorine-containing compound in terms of the solids content. The polymerizable composition 5 contained a total of 30 parts by weight of the monofunctional amide monomer (the sum of N,N-dimethylacrylamide contained as the monofunctional amide monomer (20 parts by weight) and N,N-dimethylacrylamide in the fluorine-containing compound solution (10 parts by weight)).

The specifications of the polymer layer 3 were as follows.
  Amide group concentration in polymer layer 3: 3.02 mmol/g
  Bottom temperature: 177° C.
  Minimum storage modulus E': $2 \times 10^8$ Pa Example 24

An optical member was produced as in Example 1, except that the composition of the monofunctional amide monomer, the composition of the polyfunctional acrylate, and the composition of the fluorine-containing compound were changed as follows.
<Monofunctional Amide Monomer>
  N,N-Dimethylacrylamide: 19 parts by weight
<Polyfunctional Acrylate>
  Urethane acrylate: 18 parts by weight
  Ethoxylated pentaerythritol tetraacrylate: 41 parts by weight
<Fluorine-containing compound>: 11 parts by weight In the present example, a fluorine-containing compound solution was produced by adding 11 parts by weight of N,N-dimethylacrylamide to 11 parts by weight of a fluorine-containing compound. To the polymerizable composition 5 was added 22 parts by weight of the obtained fluorine-containing compound solution, i.e., 11 parts by weight of the fluorine-containing compound in terms of the solids content. The polymerizable composition 5 contained a total of 30 parts by weight of the monofunctional amide monomer (the sum of N,N-dimethylacrylamide contained as the monofunctional amide monomer (19 parts by weight) and N,N-dimethylacrylamide in the fluorine-containing compound solution (11 parts by weight)).

The specifications of the polymer layer 3 were as follows.
  Amide group concentration in polymer layer 3: 3.02 mmol/g
  Bottom temperature: 177° C.
  Minimum storage modulus E': $2 \times 10^8$ Pa Example 25

An optical member was produced as in Example 1, except that the composition of the monofunctional amide monomer and the composition of the polyfunctional acrylate were changed as follows.
<Monofunctional Amide Monomer>
  N-Acryloylmorpholine: 42 parts by weight
  The N-acryloylmorpholine used was a monofunctional amide monomer (trade name: ACMO) from KJ Chemicals Corp.
<Polyfunctional Acrylate>
  Urethane acrylate: 17 parts by weight
  Ethoxylated pentaerythritol tetraacrylate: 39 parts by weight The polymerizable composition 5 contained a total of 43 parts by weight of the monofunctional amide monomer (the sum of N-acryloylmorpholine contained as the monofunctional amide monomer (42 parts by weight) and N,N-dimethylacrylamide in the fluorine-containing compound solution (1 part by weight)).

The specifications of the polymer layer 3 were as follows.
  Amide group concentration in polymer layer 3: 3.06 mmol/g
  Bottom temperature: 194° C.
  Minimum storage modulus E': $1.6 \times 10^8$ Pa Example 26

An optical member was produced as in Example 1, except that the composition of the monofunctional amide monomer and the composition of the polyfunctional acrylate were changed as follows.
<Monofunctional Amide Monomer>
  N,N-Diethylacrylamide: 38 parts by weight
  The N,N-diethylacrylamide used was a monofunctional amide monomer (trade name: DEAA) from KJ Chemicals Corp.
<Polyfunctional Acrylate>
  Urethane acrylate: 18 parts by weight
  Ethoxylated pentaerythritol tetraacrylate: 42 parts by weight The polymerizable composition 5 contained a total of 39 parts by weight of the monofunctional amide monomer (the sum of N,N-diethylacrylamide contained as the monofunctional amide monomer (38 parts by weight) and N,N-dimethylacrylamide in the fluorine-containing compound solution (1 part by weight)).

The specifications of the polymer layer 3 were as follows.
  Amide group concentration in polymer layer 3: 3.08 mmol/g
  Bottom temperature: 177° C.
  Minimum storage modulus E': $2 \times 10^8$ Pa Comparative Example 1

An optical member was produced as in Example 1, except that the composition of the monofunctional amide monomer and the composition of the polyfunctional acrylate were changed as follows.
<Monofunctional Amide Monomer>
  N,N-Dimethylacrylamide: 18 parts by weight
<Polyfunctional Acrylate>
  Urethane acrylate: 24 parts by weight
  Ethoxylated pentaerythritol tetraacrylate: 56 parts by weight The polymerizable composition contained a total of 19 parts by weight of the monofunctional amide monomer (the sum of N,N-dimethylacrylamide contained as the monofunctional amide monomer (18 parts by weight) and N,N-dimethylacrylamide in the fluorine-containing compound solution (1 part by weight)).

The specifications of the polymer layer were as follows.
  Amide group concentration in polymer layer: 1.91 mmol/g Bottom temperature: 168° C.
Minimum storage modulus E': 2.9×10⁸ Pa Comparative Example 2

An optical member was produced as in Example 1, except that the composition of the monofunctional amide monomer and the composition of the polyfunctional acrylate were changed as follows.
<Monofunctional amide monomer>: 0 parts by weight
<Polyfunctional Acrylate>
Urethane acrylate: 30 parts by weight
Ethoxylated pentaerythritol tetraacrylate: 68 parts by weight
The polymerizable composition contained 1 part by weight of the monofunctional amide monomer (N,N-dimethylacrylamide in the fluorine-containing compound solution (1 part by weight)).
The specifications of the polymer layer were as follows.
Amide group concentration in polymer layer: 0.10 mmol/g
Bottom temperature: 164° C.
Minimum storage modulus E': 3.5×10⁸ Pa Comparative Example 3

An optical member was produced as in Example 1, except that the composition of the monofunctional amide monomer and the composition of the polyfunctional acrylate were changed as follows.
<Monofunctional Amide Monomer>
N,N-Dimethylacrylamide: 50 parts by weight
<Polyfunctional Acrylate>
Urethane acrylate: 11 parts by weight
Ethoxylated pentaerythritol tetraacrylate: 37 parts by weight
The polymerizable composition contained a total of 51 parts by weight of the monofunctional amide monomer (the sum of N,N-dimethylacrylamide contained as the monofunctional amide monomer (50 parts by weight) and N,N-dimethylacrylamide in the fluorine-containing compound solution (1 part by weight)).
The specifications of the polymer layer were as follows.
Amide group concentration in polymer layer: 5.13 mmol/g
Bottom temperature: 208° C.
Minimum storage modulus E': 0.8×10⁸ Pa Comparative Example 4

An optical member was produced as in Example 1, except that the composition of the polyfunctional acrylate was changed as follows.
<Polyfunctional Acrylate>
Alkoxylated dipentaerythritol polyacrylate: 17.5 parts by weight
The alkoxylated dipentaerythritol polyacrylate used was a polyfunctional acrylate (trade name: KAYARAD DPEA-12) from Nippon Kayaku Co., Ltd.
Dipentaerythritol hexaacrylate: 16.5 parts by weight
The dipentaerythritol hexaacrylate used was a polyfunctional acrylate (trade name: Light Acrylate DPE-6A) from Kyoeisha Chemical Co., Ltd.
Pentaerythritol triacrylate: 17.5 parts by weight
The pentaerythritol triacrylate used was a polyfunctional acrylate (trade name: PET-3) from DKS Co. Ltd.
Polyethylene glycol (600) diacrylate: 17.5 parts by weight The polyethylene glycol (600) diacrylate used was a polyfunctional acrylate (trade name: A-600) from Shin. Nakamura Chemical Co., Ltd.
The specifications of the polymer layer were as follows.
Amide group concentration in polymer layer: 3.02 mmol/g
Bottom temperature: 233° C.
Minimum storage modulus E': 4.2×10⁸ Pa Comparative Example 5

An optical member was produced as in Example 1, except that the composition of the polyfunctional acrylate was changed as follows.
<Polyfunctional Acrylate>
Alkoxylated dipentaerythritol polyacrylate: 59 parts by weight
The alkoxylated dipentaerythritol polyacrylate used was a polyfunctional acrylate (trade name: KAYARAD DPCA-30) from Nippon Kayaku Co., Ltd.
Pentaerythritol triacrylate: 10 parts by weight
The pentaerythritol triacrylate used was a polyfunctional acrylate (trade name: PET-3) from DKS Co. Ltd.
The specifications of the polymer layer were as follows.
Amide group concentration in polymer layer: 3.02 mmol/g
Bottom temperature: 242° C.
Minimum storage modulus E': 5.4×10⁸ Pa Comparative Example 6

An optical member was produced as in Example 1, except that the composition of the polyfunctional acrylate was changed as follows.
<Polyfunctional Acrylate>
Ethoxylated pentaerythritol tetraacrylate: 30 parts by weight
Alkoxylated dipentaerythritol polyacrylate: 39 parts by weight
The alkoxylated dipentaerythritol polyacrylate used was a polyfunctional acrylate (trade name: KAYARAD DPEA-12) from Nippon Kayaku Co., Ltd.
The specifications of the polymer layer were as follows.
Amide group concentration in polymer layer: 3.02 mmol/g
Bottom temperature: 126° C.
Minimum storage modulus E': 0.88×10⁸ Pa Comparative Example 7

An optical member was produced as in Example 1, except that the composition of the polyfunctional acrylate was changed as follows.
<Polyfunctional Acrylate>
Ethoxylated pentaerythritol tetraacrylate: 55 parts by weight
Ethoxylated polyglycerin polyacrylate: 14 parts by weight
The ethoxylated polyglycerin polyacrylate used was a polyfunctional acrylate (trade name: NK ECONOMER A-PG5027E) from Shin Nakamura Chemical Co., Ltd.
The specifications of the polymer layer were as follows.
Amide group concentration in polymer layer: 3.02 mmol/g
Bottom temperature: 158° C.
Minimum storage modulus E': 0.96×10⁸ Pa

Comparative Example 8

An optical member was produced as in Example 1, except that the composition of the monofunctional amide monomer and the composition of the polyfunctional acrylate were changed as follows.
<Monofunctional Amide Monomer>
  N,N-Dimethylacrylamide: 20 parts by weight
<Polyfunctional Acrylate>
  Alkoxylated dipentaerythritol polyacrylate: 9 parts by weight
  The alkoxylated dipentaerythritol polyacrylate used was a polyfunctional acrylate (trade name: KAYARAD DPEA-12) from Nippon Kayaku Co., Ltd.
  Mixture of tripentaerythritol acrylate, mono- and di-pentaerythritol acrylates, and polypentaerythritol acrylate: 2 parts by weight
  The mixture of tripentaerythritol acrylate, mono- and di-pentaerythritol acrylates, and polypentaerythritol acrylate used was a polyfunctional acrylate (trade name: Viscoat #802) from Osaka Organic Chemical Industry Ltd.
  Ethoxylated polyglycerin polyacrylate: 67 parts by weight
  The ethoxylated polyglycerin polyacrylate used was a polyfunctional acrylate (trade name: NK ECONOMER A-PG5027E) from Shin Nakamura Chemical Co., Ltd.

The polymerizable composition contained a total of 21 parts by weight of the monofunctional amide monomer (the sum of N,N-dimethylacrylamide contained as the monofunctional amide monomer (20 parts by weight) and N,N-dimethylacrylamide in the fluorine-containing compound solution (1 part by weight)).

The specifications of the polymer layer were as follows.
Amide group concentration in polymer layer: 2.11 mmol/g
Bottom temperature: 106° C.
Minimum storage modulus E': $1.1 \times 10^8$ Pa

Comparative Example 9

An optical member was produced as in Example 1, except that the composition of the polyfunctional acrylate was changed as follows.
<Polyfunctional Acrylate>
  Ethoxylated pentaerythritol tetraacrylate: 35 parts by weight
  Ethoxylated polyglycerin polyacrylate: 34 parts by weight
  The ethoxylated polyglycerin polyacrylate used was a polyfunctional acrylate (trade name: NK ECONOMER A-PG5027E) from Shin Nakamura Chemical Co., Ltd.

The specifications of the polymer layer were as follows.
Amide group concentration in polymer layer: 3.02 mmol/g
Bottom temperature: 53° C.
Minimum storage modulus E': $0.51 \times 10^8$ Pa

Comparative Example 10

An optical member was produced as in Example 1, except that the composition of the monofunctional amide monomer and the composition of the polyfunctional acrylate were changed as follows.
<Monofunctional amide monomer>: 0 parts by weight
<Polyfunctional Acrylate>
  Urethane acrylate: 10 parts by weight
  Mixture of tripentaerythritol acrylate, mono- and di-pentaerythritol acrylates, and polypentaerythritol acrylate: 5 parts by weight
  The mixture of tripentaerythritol acrylate, mono- and di-pentaerythritol acrylates, and polypentaerythritol acrylate used was a polyfunctional acrylate (trade name: Viscoat #802) from Osaka Organic Chemical Industry Ltd.
  Ethoxylated polyglycerin polyacrylate: 83 parts by weight
  The ethoxylated polyglycerin polyacrylate used was a polyfunctional acrylate (trade name: NK ECONOMER A-PG5027E) from Shin Nakamura Chemical Co., Ltd.

The polymerizable composition contained 1 part by weight of the monofunctional amide monomer (N,N-dimethylacrylamide in the fluorine-containing compound solution (1 part by weight)).

The specifications of the polymer layer were as follows.
Amide group concentration in polymer layer: 0.10 mmol/g
Bottom temperature: 107° C.
Minimum storage modulus E': $3.2 \times 10^8$ Pa

Comparative Example 11

An optical member was produced as in Example 1, except that the composition of the monofunctional amide monomer and the composition of the polyfunctional acrylate were changed as follows.
<Monofunctional amide monomer>: 0 parts by weight
<Polyfunctional Acrylate>
  Urethane acrylate: 48 parts by weight
  Ethoxylated polyglycerin polyacrylate: 50 parts by weight
  The ethoxylated polyglycerin polyacrylate used was a polyfunctional acrylate (trade name: NK ECONOMER A-PG5027E) from Shin Nakamura Chemical Co., Ltd.

The polymerizable composition contained 1 part by weight of the monofunctional amide monomer (N,N-dimethylacrylamide in the fluorine-containing compound solution (1 part by weight)).

The specifications of the polymer layer were as follows.
Amide group concentration in polymer layer: 0.10 mmol/g
Bottom temperature: 165° C.
Minimum storage modulus E': $10.9 \times 10^8$ Pa

Comparative Example 12

An optical member was produced as in Example 1, except that the composition of the monofunctional amide monomer, the composition of the polyfunctional acrylate, and the composition of the fluorine-containing compound were changed as follows.
<Monofunctional amide Monomer>
  N,N-Dimethylacrylamide: 20 parts by weight
<Polyfunctional Acrylate>
  Alkoxylated dipentaerythritol polyacrylate: 20 parts by weight
  The alkoxylated dipentaerythritol polyacrylate used was a polyfunctional acrylate (trade name: KAYARAD DPEA-12) from Nippon Kayaku Co., Ltd.
  Dipentaerythritol hexaacrylate: 32 parts by weight
  The dipentaerythritol hexaacrylate used was a polyfunctional acrylate (trade name: Light Acrylate DPE-6A) from Kyoeisha Chemical Co., Ltd.
  Pentaerythritol triacrylate: 9 parts by weight
  The pentaerythritol triacrylate used was a polyfunctional acrylate (trade name: PET-3) from DKS Co. Ltd.
  Polyethylene glycol (600) diacrylate: 18 parts by weight
  The polyethylene glycol (600) diacrylate used was a polyfunctional acrylate (trade name: A-600) from Shin Nakamura Chemical Co., Ltd.

<Fluorine-containing compound>: 0.5 parts by weight

In the present comparative example, a fluorine-containing compound solution was produced by adding 0.5 parts by weight of N,N-dimethylacrylamide to 0.5 parts by weight of a fluorine-containing compound. To the polymerizable composition was added 1 part by weight of the obtained fluorine-containing compound solution, i.e., 0.5 parts by weight of the fluorine-containing compound in terms of the solids content. The polymerizable composition contained a total of 20.5 parts by weight of the monofunctional amide monomer (the sum of N,N-dimethylacrylamide contained as the monofunctional amide monomer (20 parts by weight) and N,N-dimethylacrylamide in the fluorine-containing compound solution (0.5 parts by weight)).

The specifications of the polymer layer were as follows.

Amide group concentration in polymer layer: 2.06 mmol/g

Bottom temperature: 186° C.

Minimum storage modulus E': 10.6×10$^8$ Pa

Comparative Example 13

An optical member was produced as in Example 1, except that the composition of the monofunctional amide monomer, the composition of the polyfunctional acrylate, and the composition of the fluorine-containing compound were changed as follows.

<Monofunctional Amide Monomer>

N,N-Dimethylacrylamide: 15 parts by weight

<Polyfunctional Acrylate>

Alkoxylated dipentaerythritol polyacrylate: 20 parts by weight

The alkoxylated dipentaerythritol polyacrylate used was a polyfunctional acrylate (trade name: KAYARAD DPEA-12) from Nippon Kayaku Co., Ltd.

Dipentaerythritol hexaacrylate: 40 parts by weight

The dipentaerythritol hexaacrylate used was a polyfunctional acrylate (trade name: Light Acrylate DPE-6A) from Kyoeisha Chemical Co., Ltd.

Pentaerythritol triacrylate: 9 parts by weight

The pentaerythritol triacrylate used was a polyfunctional acrylate (trade name: PET-3) from DKS Co. Ltd.

Polyethylene glycol (600) diacrylate: 15 parts by weight

The polyethylene glycol (600) diacrylate used was a polyfunctional acrylate (trade name: A-600) from Shin Nakamura Chemical Co., Ltd.

<Fluorine-containing compound>: 0.5 parts by weight

In the present comparative example, a fluorine-containing compound solution was produced by adding 0.5 parts by weight of N,N-dimethylacrylamide to 0.5 parts by weight of a fluorine-containing compound. To the polymerizable composition was added 1 part by weight of the obtained fluorine-containing compound solution, i.e., 0.5 parts by weight of the fluorine-containing compound in terms of the solids content. The polymerizable composition contained a total of 15.5 parts by weight of the monofunctional amide monomer (the sum of N,N-dimethylacrylamide contained as the monofunctional amide monomer (15 parts by weight) and N,N-dimethylacrylamide in the fluorine-containing compound solution (0.5 parts by weight)).

The specifications of the polymer layer were as follows.

Amide group concentration in polymer layer: 1.56 mmol/g

Bottom temperature: 190° C.

Minimum storage modulus E': 12.2×10$^8$ Pa

Comparative Example 14

An optical member was produced as in Example 1, except that the composition of the polyfunctional acrylate was changed as follows.

<Polyfunctional Acrylate>

Dipentaerythritol hexaacrylate: 45 parts by weight

The dipentaerythritol hexaacrylate used was a polyfunctional acrylate (trade name: Light Acrylate DPE-6A) from Kyoeisha Chemical Co., Ltd.

Hexafunctional polyester acrylate: 18 parts by weight

The hexafunctional polyester acrylate used was a polyfunctional acrylate (trade name: EBECRYL450) from Daicel-Allnex Ltd.

Polyethylene glycol (600) diacrylate: 6 parts by weight

The polyethylene glycol (600) diacrylate used was a polyfunctional acrylate (trade name: A-600) from Shin Nakamura Chemical Co., Ltd.

The specifications of the polymer layer were as follows.

Amide group concentration in polymer layer: 3.02 mmol/g

Bottom temperature: 245° C.

Minimum storage modulus E': 10.8×10$^8$ Pa

Comparative Example 15

An optical member was produced as in Example 1, except that the composition of the monofunctional amide monomer and the composition of the polyfunctional acrylate were changed as follows and the fluorine-containing compound was replaced by a phosphate-ester-based release agent. The present comparative example corresponds to Example 1-3 in Patent Literature 1.

<Monofunctional Amide Monomer>

N,N-Dimethylacrylamide: 20 parts by weight

<Polyfunctional Acrylate>

Dipentaerythritol hexaacrylate: 20 parts by weight

The dipentaerythritol hexaacrylate used was a polyfunctional acrylate (trade name: Light Acrylate DPE-6A) from Kyoeisha Chemical Co., Ltd.

Pentaerythritol triacrylate: 20 parts by weight

The pentaerythritol triacrylate used was a polyfunctional acrylate (trade name: PET-3) from DKS Co. Ltd.

Polyethylene glycol (200) diacrylate: 39.9 parts by weight

The polyethylene glycol (200) diacrylate used was a polyfunctional acrylate (trade name: PE-200) from DKS Co. Ltd.

<Release Agent>

(Poly)oxyethylene alkyl phosphate ester: 0.1 parts by weight

The (poly)oxyethylene alkyl phosphate ester used was a release agent (trade name: NIKKOL TDP-2) from Nikko Chemicals Co., Ltd.

The polymerizable composition contained no fluorine-containing compound.

The specifications of the polymer layer were as follows.

Amide group concentration in polymer layer: 2.01 mmol/g

Bottom temperature: 223° C.

Minimum storage modulus E': 6.3×10$^8$ Pa

Comparative Example 16

An optical member was produced as in Example 1, except that the composition of the monofunctional amide monomer and the composition of the polyfunctional acrylate were changed as follows and the fluorine-containing compound was replaced by a phosphate-ester-based release agent. The present comparative example corresponds to Example 1-18 in Patent Literature 1.
<Monofunctional Amide Monomer>
  N,N-Dimethylacrylamide: 25 parts by weight
<Polyfunctional Acrylate>
  Dipentaerythritol hexaacrylate: 20 parts by weight
  The dipentaerythritol hexaacrylate used was a polyfunctional acrylate (trade name: Light Acrylate DPE-6A) from Kyoeisha Chemical Co., Ltd.
  Pentaerythritol triacrylate: 20 parts by weight
  The pentaerythritol triacrylate used was a polyfunctional acrylate (trade name: PET-3) from DKS Co. Ltd.
  Polyethylene glycol (300) diacrylate: 25.5 parts by weight
  The polyethylene glycol (300) diacrylate used was a polyfunctional acrylate (trade name: PE-300) from DKS Co. Ltd.
  Polyethylene glycol (400) diacrylate: 9.4 parts by weight
  The polyethylene glycol (400) diacrylate used was a polyfunctional acrylate (trade name: A-400) from Shin Nakamura Chemical Co., Ltd.
<Release Agent>
  (Poly)oxyethylene alkyl phosphate ester: 0.1 parts by weight
  The (poly)oxyethylene alkyl phosphate ester used was a release agent (trade name: NIKKOL TDP-2) from Nikko Chemicals Co., Ltd.

The polymerizable composition contained no fluorine-containing compound.

The specifications of the polymer layer were as follows.
Amide group concentration in polymer layer: 2.51 mmol/g
Bottom temperature: 228° C.
Minimum storage modulus E': $4.1 \times 10^8$ Pa Comparative Example 17

An optical member was produced as in Example 1, except that the composition of the monofunctional amide monomer and the composition of the polyfunctional acrylate were changed as follows and the fluorine-containing compound was replaced by a phosphate-ester-based release agent. The present comparative example corresponds to Example 1-22 in Patent Literature 1.
<Monofunctional Amide Monomer>
  N,N-Dimethylacrylamide: 15 parts by weight
<Polyfunctional Acrylate>
  Dipentaerythritol hexaacrylate: 20 parts by weight
  The dipentaerythritol hexaacrylate used was a polyfunctional acrylate (trade name: Light Acrylate DPE-6A) from Kyoeisha Chemical Co., Ltd.
  Polyethylene glycol (200) diacrylate: 64.9 parts by weight
  The polyethylene glycol (200) diacrylate used was a polyfunctional acrylate (trade name: PE-200) from DKS Co. Ltd.
<Release Agent>
  (Poly)oxyethylene alkyl phosphate ester: 0.1 parts by weight
  The (poly)oxyethylene alkyl phosphate ester used was a release agent (trade name: NIKKOL TDP-2) from Nikko Chemicals Co., Ltd.

The polymerizable composition contained no fluorine-containing compound.

The specifications of the polymer layer were as follows.
Amide group concentration in polymer layer: 1.51 mmol/g
Bottom temperature: 164° C.
Minimum storage modulus E': $2.5 \times 10^8$ Pa Comparative Example 18

An optical member was produced as in Example 1, except that the composition of the monofunctional amide monomer and the composition of the polyfunctional acrylate were changed as follows and the fluorine-containing compound was replaced by a silicone-based release agent. The present comparative example corresponds to the example using Resin D in Patent Literature 2.
<Monofunctional Amide Monomer>
  N-Vinyl-2-pyrrolidone: 33.2 parts by weight
  The N-vinyl-2-pyrrolidone used was a monofunctional amide monomer (trade name: N-vinylpyrrolidone) from Nippon Shokubai Co., Ltd.
<Polyfunctional Acrylate>
  1,9-Nonanediol diacrylate: 33.3 parts by weight
  The 1,9-nonanediol diacrylate used was a polyfunctional acrylate (trade name: A-NOD-N) from Shin Nakamura Chemical Co., Ltd.
  Trimethylolpropane triacrylate: 33.3 parts by weight
  The trimethylolpropane triacrylate used was a polyfunctional acrylate (trade name: Light Acrylate TMP-A) from Kyoeisha Chemical Co., Ltd.
<Release Agent>
  Silicone diacrylate: 0.2 parts by weight
  The silicone diacrylate used was a release agent (trade name: EBECRYL350) from Daicel-Allnex Ltd.

The polymerizable composition contained no fluorine-containing compound.

The specifications of the polymer layer were as follows.
Amide group concentration in polymer layer: 2.98 mmol/g
Bottom temperature: 235° C.
Minimum storage modulus E': $1.4 \times 10^8$ Pa Comparative Example 19

An optical member was produced as in Example 1, except that the composition of the monofunctional amide monomer, the composition of the polyfunctional acrylate, and the composition of the fluorine-containing compound were changed as follows and a monofunctional acrylate was further added. The present comparative example corresponds to Example 3 in Patent Literature 3.
<Monofunctional Amide Monomer>
  N,N-Dimethylacrylamide: 45 parts by weight
<Polyfunctional acrylate>: 0 parts by weight
<Monofunctional Acrylate>
  Polypropylene glycol monoacrylate: 55 parts by weight
  The polypropylene glycol monoacrylate used was a monofunctional acrylate (trade name: AP-550) from NOF Corporation.

<Fluorine-containing compound>: 0 parts by weight

The specifications of the polymer layer were as follows.

Amide group concentration in polymer layer: 4.52 mmol/g

Bottom temperature: higher than 250° C.

Minimum storage modulus E': less than $0.1 \times 10^8$ Pa

Comparative Example 20

An optical member was produced as in Example 1, except that the composition of the monofunctional amide monomer and the composition of the polyfunctional acrylate were changed as follows and the fluorine-containing compound was replaced by a phosphate-ester-based release agent. The present comparative example corresponds to the example (surface layer) in Patent Literature 4.

<Monofunctional amide monomer>: 0 parts by weight
<Polyfunctional Acrylate>

Alkoxylated dipentaerythritol polyacrylate: 25 parts by weight

The alkoxylated dipentaerythritol polyacrylate used was a polyfunctional acrylate (trade name: KAYARAD DPEA-12) from Nippon Kayaku Co., Ltd.

Dipentaerythritol hexaacrylate: 25 parts by weight

The dipentaerythritol hexaacrylate used was a polyfunctional acrylate (trade name: Light Acrylate DPE-6A) from Kyoeisha Chemical Co., Ltd.

Pentaerythritol triacrylate: 25 parts by weight

The pentaerythritol triacrylate used was a polyfunctional acrylate (trade name: PET-3) from DKS Co. Ltd.

Polyethylene glycol (600) diacrylate: 24.9 parts by weight

The polyethylene glycol (600) diacrylate used was a polyfunctional acrylate (trade name: A-600) from Shin Nakamura Chemical Co., Ltd.

<Release Agent>

(Poly)oxyethylene alkyl phosphate ester: 0.1 parts by weight

The (poly)oxyethylene alkyl phosphate ester used was a release agent (trade name: NIKKOL TDP-2) from Nikko Chemicals Co., Ltd.

The polymerizable composition contained no fluorine-containing compound.

The specifications of the polymer layer were as follows.

Amide group concentration in polymer layer: 0 mmol/g

Bottom temperature: 166° C.

Minimum storage modulus E': $8.8 \times 10^8$ Pa

[Evaluation of Optical Member]

The evaluation results of the adhesion between the substrate and the polymer layer and the rubbing resistance of the optical members of Examples 1 to 26 and Comparative Examples 1 to 20 are shown in Tables 1 and 2.

(Evaluation of Adhesion)

The adhesion between the substrate and the polymer layer in the cases of applying ultraviolet rays in the step (c) under Condition 1 (dose of ultraviolet rays: 1 J/cm$^2$) and Condition 2 (dose of ultraviolet rays: 0.5 J/cm$^2$) was evaluated by the following respective methods. Here, Condition 2 is a condition where the adhesion is more likely to decrease than under Condition 1. First, in an environment with a temperature of 23° C. and a humidity of 50%, 11 vertical cuts and 11 horizontal cuts were made in a grid pattern with 1 mm spacing on the surface of the polymer layer opposite to the substrate using a snap-off utility knife. Thereby, 100 squares (1 mm square) were formed. Then, polyester adhesive tape (trade name: No. 31B) from Nitto Denko Corp. was press-applied to the squares and peeled off in the 90° direction relative to the surface of the squares at a rate of 100 mm/s. The state of the polymer layer on the substrate after the peeling was visually observed, and the number of squares in which the polymer layer peeled off from the substrate was counted. The results are shown as "X/100", where X is the number of squares in which the polymer layer peeled from the substrate. The determination criteria are as follows.

<Adhesion under Condition 1>

Level A: None of 100 squares peeled (0/100).

Level B: One to 99 out of 100 squares peeled (1/100 to 99/100).

Level C: 100 out of 100 squares peeled (100/100).

Optical members at Level A were evaluated as having no practical problems (having high adhesion under Condition 1).

<Adhesion Under Condition 2>

Level a: None of 100 squares peeled (0/100).

Level b: One or two out of 100 squares peeled (1/100 and 2/100).

Level c: Three to five out of 100 squares peeled (3/100 to 5/100).

Level d: Six to 99 out of 100 squares peeled (6/100 to 99/100).

Level e: 100 out of 100 squares peeled (100/100).

Optical members at Level a, Level b, or Level c were evaluated as having no practical problems (having high adhesion under Condition 2).

Based on the evaluation results of the adhesion under Condition 1 and the adhesion under Condition 2 by the methods described above, the comprehensive evaluation of the adhesion was made as follows.

Excellent: Adhesion under Condition 1 was at Level A and adhesion under Condition 2 was at Level a.

Good: Adhesion under Condition 1 was at Level A and adhesion under Condition 2 was at Level b.

Fair: Adhesion under Condition 1 was at Level A and adhesion under Condition 2 was at Level c.

Poor: Adhesion under Condition 1 was at Level A or Level B and adhesion under Condition 2 was at Level d or Level e.

Bad: Adhesion under Condition 1 was at Level C and adhesion under Condition 2 was at Level e.

Optical members with the comprehensive evaluation of excellent, good, or fair were evaluated as having no practical problems.

(Evaluation of Rubbing Resistance)

The rubbing resistance was evaluated based on the reflectances of the optical member of each example under Condition 1 before and after rubbing the surface of the optical member with nonwoven fabric. Specifically, a black acrylic plate was attached to the surface of the substrate opposite to the polymer layer in the optical member of each example. The surface of the polymer layer opposite to the substrate in the optical member of each example was irradiated with light from a light source from a polar angle of 5° and the specular spectral reflectance at an incident angle of 5° was measured. The reflectance was measured with a spectrophotometer (trade name: UV-3100PC) from Shimadzu Corporation within the wavelength range of 380 to 780 nm. The average reflectance within the wavelength range of 450 to 650 nm was calculated based on the measurement results. The average reflectance is referred to as Reflectance A (unit: %).

The surface of the polymer layer of the optical member of each example opposite to the substrate was rubbed 10 reciprocations with nonwoven fabric (trade name: BEMCOT® LABO) from Asahi Kasei Fibers Corp. The specular spectral reflectance at an incident angle of 5° of the optical member of each example was measured by the same procedure as described above. The average reflectance within the wavelength range of 450 to 650 nm was calculated based on the measurement results. The average reflectance is referred to as Reflectance B (unit: %).

The rubbing resistance was evaluated using "change (unit: %) in reflectance before and after rubbing=100×(Reflectance B−Reflectance A)/Reflectance A", and the evaluation criteria are as follows.

Excellent: Change in reflectance was 15% or less.
Good: Change in reflectance was more than 15% and less than 25%.
Fair: Change in reflectance was 25% or more and 30% or less.
Poor: Change in reflectance was more than 30% and less than 50%.
Bad: Change in reflectance was 50% or more.

Optical members with the determination result of excellent, good, or fair were evaluated as not appearing white and thus have no practical problems.

TABLE 1

| | Adhesion | | | | Rubbing resistance | |
|---|---|---|---|---|---|---|
| | Condition 1 | | Condition 2 | | Change (%) | |
| | Result | Evaluation | Result | Evaluation | Comprehensive evaluation | in reflectance | Evaluation |
| Example 1 | 0/100 | Level A | 0/100 | Level a | Excellent | 12 | Excellent |
| Example 2 | 0/100 | Level A | 0/100 | Level a | Excellent | 15 | Excellent |
| Example 3 | 0/100 | Level A | 2/100 | Level b | Good | 11 | Excellent |
| Example 4 | 0/100 | Level A | 5/100 | Level c | Fair | 8 | Excellent |
| Example 5 | 0/100 | Level A | 0/100 | Level a | Excellent | 18 | Good |
| Example 6 | 0/100 | Level A | 0/100 | Level a | Excellent | 27 | Fair |
| Example 7 | 0/100 | Level A | 0/100 | Level a | Excellent | 16 | Good |
| Example 8 | 0/100 | Level A | 0/100 | Level a | Excellent | 29 | Fair |
| Example 9 | 0/100 | Level A | 0/100 | Level a | Excellent | 24 | Good |
| Example 10 | 0/100 | Level A | 0/100 | Level a | Excellent | 27 | Fair |
| Example 11 | 0/100 | Level A | 0/100 | Level a | Excellent | 29 | Fair |
| Example 12 | 0/100 | Level A | 3/100 | Level c | Fair | 13 | Excellent |
| Example 13 | 0/100 | Level A | 4/100 | Level c | Fair | 18 | Good |
| Example 14 | 0/100 | Level A | 5/100 | Level c | Fair | 29 | Fair |
| Example 15 | 0/100 | Level A | 4/100 | Level c | Fair | 15 | Excellent |
| Example 16 | 0/100 | Level A | 4/100 | Level c | Fair | 23 | Good |
| Example 17 | 0/100 | Level A | 5/100 | Level c | Fair | 29 | Fair |
| Example 18 | 0/100 | Level A | 0/100 | Level a | Excellent | 28 | Fair |
| Example 19 | 0/100 | Level A | 0/100 | Level a | Excellent | 24 | Good |
| Example 20 | 0/100 | Level A | 0/100 | Level a | Excellent | 20 | Good |
| Example 21 | 0/100 | Level A | 0/100 | Level a | Excellent | 14 | Excellent |
| Example 22 | 0/100 | Level A | 1/100 | Level b | Good | 14 | Excellent |
| Example 23 | 0/100 | Level A | 4/100 | Level c | Fair | 12 | Excellent |
| Example 24 | 0/100 | Level A | 5/100 | Level c | Fair | 10 | Excellent |
| Example 25 | 0/100 | Level A | 0/100 | Level a | Excellent | 23 | Good |
| Example 26 | 0/100 | Level A | 0/100 | Level a | Excellent | 15 | Excellent |

TABLE 2

| | Adhesion | | | | Rubbing resistance | |
|---|---|---|---|---|---|---|
| | Condition 1 | | Condition 2 | | Change (%) | |
| | Result | Evaluation | Result | Evaluation | Comprehensive evaluation | in reflectance | Evaluation |
| Comparative Example 1 | 3/100 | Level B | 17/100 | Level d | Poor | 11 | Excellent |
| Comparative Example 2 | 100/100 | Level C | 100/100 | Level e | Bad | 8 | Excellent |
| Comparative Example 3 | 0/100 | Level A | 0/100 | Level a | Excellent | 43 | Poor |
| Comparative Example 4 | 0/100 | Level A | 0/100 | Level a | Excellent | 46 | Poor |
| Comparative Example 5 | 0/100 | Level A | 0/100 | Level a | Excellent | 60 | Bad |
| Comparative Example 6 | 0/100 | Level A | 0/100 | Level a | Excellent | 41 | Poor |
| Comparative Example 7 | 0/100 | Level A | 0/100 | Level a | Excellent | 48 | Poor |
| Comparative Example 8 | 0/100 | Level A | 4/100 | Level c | Fair | 40 | Poor |
| Comparative Example 9 | 0/100 | Level A | 0/100 | Level a | Excellent | 84 | Bad |
| Comparative Example 10 | 100/100 | Level C | 100/100 | Level e | Bad | 37 | Poor |

TABLE 2-continued

|  | Adhesion | | | | | Rubbing resistance | |
|---|---|---|---|---|---|---|---|
|  | Condition 1 | | Condition 2 | | Comprehensive | Change (%) | |
|  | Result | Evaluation | Result | Evaluation | evaluation | in reflectance | Evaluation |
| Comparative Example 11 | 100/100 | Level C | 100/100 | Level e | Bad | 35 | Poor |
| Comparative Example 12 | 0/100 | Level A | 5/100 | Level c | Fair | 34 | Poor |
| Comparative Example 13 | 7/100 | Level B | 29/100 | Level d | Poor | 55 | Bad |
| Comparative Example 14 | 0/100 | Level A | 0/100 | Level a | Excellent | 37 | Poor |
| Comparative Example 15 | 0/100 | Level A | 5/100 | Level c | Fair | 48 | Poor |
| Comparative Example 16 | 0/100 | Level A | 1/100 | Level b | Good | 49 | Poor |
| Comparative Example 17 | 8/100 | Level B | 78/100 | Level d | Poor | 14 | Excellent |
| Comparative Example 18 | 0/100 | Level A | 0/100 | Level a | Excellent | 47 | Poor |
| Comparative Example 19 | 0/100 | Level A | 3/100 | Level c | Fair | 94 | Bad |
| Comparative Example 20 | 100/100 | Level C | 100/100 | Level e | Bad | 21 | Good |

As shown in Table 1, the adhesion and the rubbing resistance were both high in all of Examples 1 to 26. In particular, the adhesion and the rubbing resistance were comparatively high in Example 3, Example 5, Example 7, Example 9, Example 19, Example 20, Example 22, and Example 25, and the adhesion and the rubbing resistance were especially high in Example 1, Example 2, Example 21, and Example 26.

In comparison of Example 1, Example 2, Example 3, Example 4, Example 5, and Example 6 which used the same monofunctional amide monomer (N,N-dimethylacrylamide), the adhesion under Condition 2 was maintained or increased as the amide group concentration in the polymer layer increased in the following order: Example 4 (2.01 mmol/g), Example 3 (2.51 mmol/g), Example 1 (3.02 mmol/g), Example 2 (3.92 mmol/g), Example 5 (4.42 mmol/g), and Example 6 (4.92 mmol/g). Meanwhile, the rubbing resistance increased in the following order of decreasing amide group concentration in the polymer layer: Example 6 (4.92 mmol/g), Example 5 (4.42 mmol/g), Example 2 (3.92 mmol/g), Example 1 (3.02 mmol/g), Example 3 (2.51 mmol/g), and Example 4 (2.01 mmol/g). These results show that with the amide group concentration in the polymer layer controlled at an optimal level, the adhesion between the substrate and the polymer layer and the rubbing resistance can both be increased. The results also show that for sufficient increase in the adhesion between the substrate and the polymer layer and the rubbing resistance, the polymer layer preferably has an amide group concentration of 2.5 mmol/g or higher and lower than 4.5 mmol/g, more preferably 3 mmol/g or higher and lower than 4 mmol/g.

In the case where the bottom temperature was 125° C. or higher and 195° C. or lower and the minimum storage modulus E' was $1.5 \times 10^8$ Pa or higher and $9 \times 10^8$ Pa or lower as in Example 5, Example 7, Example 9, Example 13, Example 16, and Example 25, the rubbing resistance was comparatively high. Furthermore, in the case where the bottom temperature was 140° C. or higher and 180° C. or lower and the minimum storage modulus E' was $2 \times 10^8$ Pa or higher and $8 \times 10^8$ Pa or lower as in Example 1, Example 2, Example 3, Example 4, Example 12, Example 15, Example 21, Example 22, Example 23, Example 24, and Example 26, the rubbing resistance was especially high. These results show that with the bottom temperature and the minimum storage modulus E' controlled at the respective optimal levels, the rubbing resistance can be increased.

The results show that with the amide group concentration in the polymer layer, the bottom temperature, and the minimum storage modulus E' controlled at the respective optimal levels, the adhesion between the substrate and the polymer layer and the rubbing resistance can be increased.

In comparison of Example 1, Example 18, Example 19, and Example 20 which used the same fluorine-containing compound, the rubbing resistance increased as amount of the fluorine-containing compound increased in the following order: Example 18 (0 parts by weight), Example 19 (0.1 parts by weight), Example 20 (0.5 parts by weight), and Example 1 (1 part by weight). This is because the amount of the fluorine atoms in the polymer layer increases in the order of Example 18, Example 19, Example 20, and Example 1 and the smoothness of the surface of the polymer layer opposite to the substrate increases. Meanwhile, in comparison of Example 21, Example 22, Example 23, and Example 24 which used the same fluorine-containing compound, the adhesion under Condition 2 increased in the following order of decreasing amount of the fluorine-containing compound: Example 24 (11 parts by weight), Example 23 (10 parts by weight), Example 22 (8 parts by weight), and Example 21 (5 parts by weight). This is because the amount of the fluorine atoms in the polymer layer decreases in the order of Example 24, Example 23, Example 22, and Example 21 and thus the fluorine atoms are efficiently distributed on the surface of the polymer layer opposite to the substrate without being highly distributed on the surface of the polymer layer adjacent to the substrate. In other words, the amount of the amino groups on the surface of the polymer layer adjacent to the substrate is greater in Example 21 than in Example 24. These results show that with the amount of the fluorine-containing compound controlled at the optimal level, the adhesion between the substrate and the polymer layer and the rubbing resistance can be increased. The results also show that for sufficient increase in the adhesion between the substrate and the polymer layer and the rubbing resistance, the polymerizable composition preferably contains 0.1 parts by weight or more and 10 parts by weight or less, more preferably 0.5 parts by weight or more and 8 parts by weight or less, still more preferably 1 part by weight or more and 5 parts by weight or less of the fluorine-containing compound.

In contrast, as shown in Table 2, at least one of the adhesion and the rubbing resistance was low in all of Comparative Examples 1 to 20. In Comparative Example 1, Comparative Example 2, Comparative Example 17, and Comparative Example 20, the adhesion was low because the polymer layer had an amide group concentration lower than 2 mmol/g. In Comparative Example 3, the rubbing resistance was low because the polymer layer had an amide group concentration of 5 mmol/g or higher and a minimum storage modulus E' less than $1 \times 10^8$ Pa. In Comparative Example 4, Comparative Example 5, Comparative Example 15, Comparative Example 16, and Comparative Example 18, the rubbing resistance was low because the bottom temperature was higher than 210° C. In Comparative Example 6 and Comparative Example 7, the rubbing resistance was low because the minimum storage modulus E' was less than $1 \times 10^8$ Pa. In Comparative Example 8, the rubbing resistance was low because the bottom temperature was lower than 110° C. In Comparative Example 9, the rubbing resistance was low because the bottom temperature was lower than 110° C. and the minimum storage modulus E' was less than $1 \times 10^8$ Pa. In Comparative Example 10, the adhesion and the rubbing resistance were low because the polymer layer had an amide group concentration lower than 2 mmol/g and a bottom temperature lower than 110° C. In Comparative Example 11 and Comparative Example 13, the adhesion and the rubbing resistance were low because the polymer layer had an amide group concentration lower than 2 mmol/g and a minimum storage modulus E' greater than $1 \times 10^9$ Pa. In Comparative Example 12, the rubbing resistance was low because the minimum storage modulus E' was higher than $1 \times 10^9$ Pa. In Comparative Example 14, the rubbing resistance was low because the bottom temperature was higher than 210° C. and also the minimum storage modulus E' was higher than $1 \times 10^9$ Pa. In Comparative Example 19, the rubbing resistance was low because the bottom temperature was higher than 210° C. and the minimum storage modulus E' was less than $1 \times 10^8$ Pa.

ADDITIONAL REMARKS

Preferred examples of the features of the optical member of the present invention are mentioned below. The examples may appropriately be combined with each other within the spirit of the present invention.

The polymer layer may have an amide group concentration of 2.5 mmol/g or higher and lower than 4.5 mmol/g. This configuration can further increase the adhesion between the substrate and the polymer layer and the rubbing resistance.

The polymer layer may have an amide group concentration of 3 mmol/g or higher and lower than 4 mmol/g. This configuration can further increase the adhesion between the substrate and the polymer layer and the rubbing resistance.

The bottom temperature may be 125° C. or higher and 195° C. or lower and the minimum storage modulus E' may be $1.5 \times 10^8$ Pa or higher and $9 \times 10^8$ Pa or lower. This configuration can further increase the rubbing resistance of the optical member (polymer layer).

The bottom temperature may be 140° C. or higher and 180° C. or lower and the minimum storage modulus E' may be $2 \times 10^8$ Pa or higher and $8 \times 10^8$ Pa or lower. This configuration can further increase the rubbing resistance of the optical member (polymer layer).

The polymer layer may be a cured product of a (meth) acrylic polymerizable composition, and the (meth)acrylic polymerizable composition may contain 20 parts by weight or more and 49 parts by weight or less of a monofunctional amide monomer and 0.1 parts by weight or more and 10 parts by weight or less of a fluorine-containing compound. This configuration can increase the smoothness of the surface of the polymer layer opposite to the substrate, thereby increasing the rubbing resistance of the optical member (polymer layer). This configuration can also reduce a decrease in the adhesion between the substrate and the polymer layer due to hygroscopy.

The (meth)acrylic polymerizable composition may contain 0.5 parts by weight or more and 8 parts by weight or less of the fluorine-containing compound. This configuration can further increase the rubbing resistance of the optical member (polymer layer). This configuration can also further reduce a decrease in the adhesion between the substrate and the polymer layer due to hygroscopy.

The (meth)acrylic polymerizable composition may contain 1 part by weight or more and 5 parts by weight or less of the fluorine-containing compound. This configuration can further increase the rubbing resistance of the optical member (polymer layer). This configuration can also further reduce a decrease in the adhesion between the substrate and the polymer layer due to hygroscopy.

The (meth)acrylic polymerizable composition may be of solvent-free. Such a (meth)acrylic polymerizable composition can reduce the cost relating to the use of a solvent and environmental load. This configuration can also eliminate the need for a device for drying and removing a solvent, enabling reduction in the cost relating to such a device.

The monofunctional amide monomer may contain at least one of N,N-dimethylacrylamide and N,N-diethylacrylamide. This configuration can favorably increase the adhesion between the substrate and the polymer layer and the rubbing resistance even in the case where the amount of the monofunctional amide monomer is small.

The substrate may contain triacetyl cellulose at least on a surface thereof adjacent to the polymer layer. This configuration can increase the adhesion between the substrate and the polymer layer even in the case where triacetyl cellulose with high polarity is present at least on the surface of the substrate adjacent to the polymer layer.

Examples of the preferred features of the optical member of the present invention are mentioned above. Examples relating to the features of the polymer layer among these examples are also examples of preferred features of the polymer layer of the present invention.

REFERENCE SIGNS LIST

1: optical member
2: substrate
3: polymer layer
4: projection
5: polymerizable composition
6: die
P: pitch

The invention claimed is:
1. An optical member comprising
a substrate and
a polymer layer that is in direct contact with the substrate and includes on a surface thereof an uneven structure provided with multiple projections at a pitch not longer than a wavelength of visible light, the polymer layer containing an amide group, the polymer layer having an amide group concentration of 2 mmol/g or higher and lower than 5 mmol/g, the polymer layer having a minimum storage modulus E' of $1\times10^8$ Pa or higher and $1\times10^9$ Pa or lower at a bottom temperature of 110° C. or higher and 210° C. or lower in a dynamic viscoelasticity measurement with a measurement temperature range of −50° C. to 250° C., a temperature rise rate of 5° C./min, and a frequency of 10 Hz.

2. The optical member according to claim 1, wherein the polymer layer has an amide group concentration of 2.5 mmol/g or higher and lower than 4.5 mmol/g.

3. The optical member according to claim 2, wherein the polymer layer has an amide group concentration of 3 mmol/g or higher and lower than 4 mmol/g.

4. The optical member according to claim 1, wherein the bottom temperature is 125° C. or higher and 195° C. or lower and the minimum storage modulus E' is $1.5\times10^8$ Pa or higher and $9\times10^8$ Pa or lower.

5. The optical member according to claim 4, wherein the bottom temperature is 140° C. or higher and 180° C. or lower and the minimum storage modulus E' is $2\times10^8$ Pa or higher and $8\times10^8$ Pa or lower.

6. The optical member according to claim 1, wherein the polymer layer is a cured product of a (meth)acrylic polymerizable composition, and the (meth)acrylic polymerizable composition contains 20 parts by weight or more and 49 parts by weight or less of a monofunctional amide monomer and 0.1 parts by weight or more and 10 parts by weight or less of a fluorine-containing compound.

7. The optical member according to claim 6, wherein the (meth)acrylic polymerizable composition contains 0.5 parts by weight or more and 8 parts by weight or less of the fluorine-containing compound.

8. The optical member according to claim 7, wherein the (meth)acrylic polymerizable composition contains 1 part by weight or more and 5 parts by weight or less of the fluorine-containing compound.

9. The optical member according to claim 6, wherein the (meth)acrylic polymerizable composition is solvent-free.

10. The optical member according to claim 6, wherein the monofunctional amide monomer contains at least one of N,N-dimethylacrylamide and N,N-diethylacrylamide.

11. The optical member according to claim 1, wherein the substrate contains triacetyl cellulose at least on a surface thereof adjacent to the polymer layer.

12. A polymer layer comprising, on a surface thereof, an uneven structure provided with multiple projections at a pitch not longer than a wavelength of visible light, the polymer layer containing an amide group at a concentration of 2 mmol/g or higher and lower than 5 mmol/g, the polymer layer having a minimum storage modulus E' of $1\times10^8$ Pa or higher and $1\times10^9$ Pa or lower at a bottom temperature of 110° C. or higher and 210° C. or lower in a dynamic viscoelasticity measurement with a measurement temperature range of −50° C. to 250° C., a temperature rise rate of 5° C./min, and a frequency of 10 Hz.

* * * * *